US010445489B2

(12) United States Patent
Hayashi et al.

(10) Patent No.: US 10,445,489 B2
(45) Date of Patent: Oct. 15, 2019

(54) INFORMATION PROCESSING SYSTEM, INFORMATION PROCESSING APPARATUS, AND METHOD FOR PROCESSING INFORMATION

(71) Applicants: Yuuichiroh Hayashi, Kanagawa (JP);
Kazunori Sugimura, Kanagawa (JP);
Kohsuke Namihira, Kanagawa (JP);
Hikaru Kominami, Kanagawa (JP);
Dongzhe Zhang, Kanagawa (JP);
Ryutaro Sakanashi, Kanagawa (JP);
Zhi Min, Tokyo (JP)

(72) Inventors: Yuuichiroh Hayashi, Kanagawa (JP);
Kazunori Sugimura, Kanagawa (JP);
Kohsuke Namihira, Kanagawa (JP);
Hikaru Kominami, Kanagawa (JP);
Dongzhe Zhang, Kanagawa (JP);
Ryutaro Sakanashi, Kanagawa (JP);
Zhi Min, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 310 days.

(21) Appl. No.: 15/263,485

(22) Filed: Sep. 13, 2016

(65) Prior Publication Data

US 2017/0083697 A1    Mar. 23, 2017

(30) Foreign Application Priority Data

Sep. 18, 2015 (JP) ................. 2015-184967
Jul. 27, 2016 (JP) ................. 2016-147243

(51) Int. Cl.
*G06F 21/44* (2013.01)
*G06F 21/31* (2013.01)

(52) U.S. Cl.
CPC .............. *G06F 21/44* (2013.01); *G06F 21/31* (2013.01)

(58) Field of Classification Search
CPC .......... G06F 21/44; G06F 21/31; G06F 21/10; G06F 21/62; G06F 21/629; G06F 21/6218

See application file for complete search history.

(56) References Cited

U.S. PATENT DOCUMENTS 9,124,733 B2    9/2015  Ando
2003/0041142 A1  2/2003  Zhang et al.
(Continued)

FOREIGN PATENT DOCUMENTS

JP    2003-067207    3/2003
JP    2003-157242    5/2003
(Continued)

*Primary Examiner* — Noura Zoubair
(74) *Attorney, Agent, or Firm* — IPUSA, PLLC

(57) ABSTRACT

An information processing system including programs respectively executing predetermined processes includes a first memory unit storing, for each application executing a sequence of processes using electronic data in collaboration with an external service, flow information that defines program identification information and an execution order of the programs, app identification information, a permitting unit receiving a first request that includes the app identification information and external service identification information, acquiring a permission token from the external service, and causing a second memory unit to store the acquired permission token, user identification information, and the app identification information, a sending unit receiving a second request, and a process executing unit receiving a third request and causing the program to execute the sequence of processes, wherein the permitting unit determines a scope of the permission token based on the flow information stored in association with the app identification information.

5 Claims, 17 Drawing Sheets

(56) References Cited

U.S. PATENT DOCUMENTS

| | | | |
|---|---|---|---|
| 2014/0223004 A1* | 8/2014 | Honda | H04L 67/1097 709/224 |
| 2014/0223320 A1* | 8/2014 | Sugimura | G06F 3/0484 715/740 |
| 2016/0241724 A1 | 8/2016 | Sugimura et al. | |

FOREIGN PATENT DOCUMENTS

| | | |
|---|---|---|
| JP | 2014-032659 | 2/2014 |
| JP | 2016-154000 | 8/2016 |

* cited by examiner

FIG.5A

| COMMON I/F OF FILE PROCESSING UNIT | |
|---|---|
| COMMON I/F | SUMMARY |
| /EXTERNAL SERVICE NAME/process/file | ACQUIRING FILE FROM DESIGNATED STORAGE SERVICE |
| /EXTERNAL SERVICE NAME/process/folder | STORING FILE IN DESIGNATED STORAGE SERVICE |
| ... | ... |

FIG.5B

| UNIQUE I/F OF FILE PROCESSING UNIT | |
|---|---|
| UNIQUE I/F | SUMMARY |
| /EXTERNAL SERVICE NAME /process/extension/attach | ADDING FILE TO DOCUMENT STORED IN DESIGNATED STORAGE SERVICE |
| ... | ... |

FIG.5C

| COMMON I/F OF DATA PROCESSING UNIT | |
|---|---|
| COMMON I/F | SUMMARY |
| /EXTERNAL SERVICE NAME/data/files | ACQUIRING FILE VIEW FROM DESIGNATED STORAGE SERVICE |
| /EXTERNAL SERVICE NAME/data/folders | ACQUIRING FOLDER VIEW FROM DESIGNATED STORAGE SERVICE |
| ... | ... |

FIG.5D

| UNIQUE I/F OF DATA PROCESSING UNIT | |
|---|---|
| UNIQUE I/F | SUMMARY |
| /EXTERNAL SERVICE NAME /data/extension/images | ACQUIRING IMAGE FILE VIEW FROM DESIGNATED STORAGE SERVICE |
| ... | ... |

| EXTERNAL SERVICE ID | CLIENT ID | CLIENT SECRET | PERMISSION SERVER URL | REDIRECT DESTINATION URL |
|---|---|---|---|---|
| service_a | AAAAAAAA | XXXXXXXX | http://www.OOO.com/auth | http://www.XXX.co.jp/callback |
| service_b | AAAA0000 | YYYYYYYY | http://www.AAA.com/auth | http://www.XXX.co.jp/callback |
| service_c | BBBBBBBB | ZZZZZZZZ | http://www.XXX.com/auth | http://www.XXX.co.jp/callback |
| ... | ... | ... | ... | ... |

| USER ID | APP ID | EXTERNAL SERVICE ID | PERMISSION TOKEN | SCOPE | EXPIRATION DATE |
|---|---|---|---|---|---|
| user001 | app001 | service_a | aaaaa | aa | 2015/10/15 |
| user001 | app002 | service_b | bbbbb | bb | 2015/10/15 |
| user002 | app003 | service_a | ccccc | aa,bb | 2015/11/7 |
| ... | ... | ... | ... | ... | ... |

From("file : input") }1201A

.to("process : ocr") }1202A

.to("process : auth?type=service-a") }1203A

.to("storage : send_to_folder ? type=service-a") }1204A

| COMPONENT NAME | EXTERNAL SERVICE ID | SCOPE |
|---|---|---|
| DELIVERY A COMPONENT | service_a | aa |
| ACQUISITION A COMPONENT | service_a | bb |
| DELIVERY B COMPONENT | service_b | cc |
| ACQUISITION B COMPONENT | service_b | cc,dd |
| OCR COMPONENT | – | – |
| AUTHENTICATION A COMPONENT | service_a | – |
| ... | ... | ... |

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

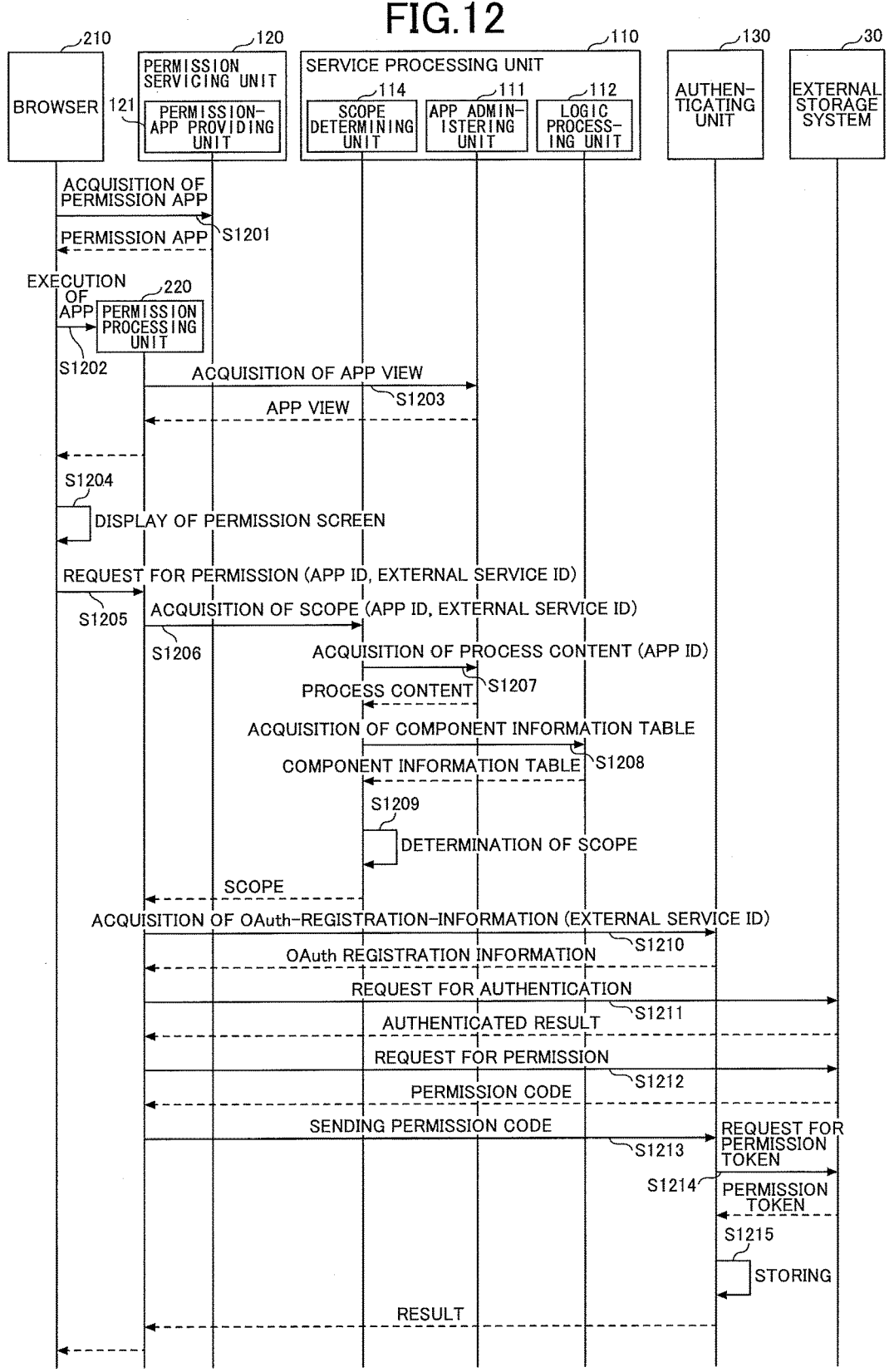

INFORMATION PROCESSING SYSTEM, INFORMATION PROCESSING APPARATUS, AND METHOD FOR PROCESSING INFORMATION

CROSS-REFERENCE TO RELATED APPLICATIONS

The present application claims priority under 35 U.S.C. § 119 to Japanese Patent Application No. 2015-184967, filed Sep. 18, 2015, and Japanese Patent Application No. 2016-147243, filed Jul. 27, 2016. The contents of which are incorporated herein by reference in their entirety.

BACKGROUND OF THE INVENTION

Field of the Invention

The present invention relates to an information processing system, an information processing apparatus, and a method for processing information.

Description of the Related Art

In recent years, various external services are provided by cloud computing or the like. For example, there is known an external service, in which electronic data designated by a user are stored in an external storage, or the like.

For example, there is a technique of storing image data, which are acquired by scanning an original using an image forming apparatus, in an external storage (for example, Japanese Unexamined Patent Application Publication No. 2014-032659). As described, there is a technique that the image forming apparatus and the external service collaborate to process.

Here, an authentication method used to process in collaboration with the external service is a technique called OAuth. In OAuth, an application being processed in collaboration with the external service is permitted to use resources of the external service within a range set as a scope.

SUMMARY OF THE INVENTION

An information processing system including at least one information processing apparatus and a plurality of programs respectively executing predetermined processes, the information processing system including a hardware storage implementing a first memory unit configured to store, for each application executing a sequence of processes using electronic data in collaboration with an external service, flow information that defines program identification information that identifies at least one program from among the plurality of programs, the at least one program executing each process of the sequence of processes, and an execution order of the at least one program, application (app) identification information that identifies the application, and screen information of a screen on which the electronic data used in the sequence of processes is designated, while associating the flow information, the app identification information, and the screen information; and a hardware processor implementing a permitting unit configured to receive, from one apparatus from among at least one apparatus coupled to information processing system, a first request that includes the app identification information and external service identification information of the external service, which executes the sequence of processes in collaboration with the application identified by the app identification information, acquire a permission token from the external service identified by the external service identification information included in the first request, after the first request is received, and cause a second memory unit to store the acquired permission token, user identification information identifying a user, and the app identification information while associating the acquired permission token, the user identification information, and the app identification information, a sending unit configured to receive a second request including the app identification information from the one apparatus, and send the screen information stored in the first memory unit in association with the app identification information included in the second request to the one apparatus being a request source of the second request, after the second request is received, and a process executing unit configured to receive a third request including information related to the electronic data designated by the user through the screen displayed on the first screen based on the screen information sent by the sending unit, and cause each of the at least one program identified by the program identification information defined in the flow information stored in the first memory unit using the permission token stored in the second memory unit in accordance with the execution order defined in the flow information to execute the sequence of processes using the electronic data based on the information related to the electronic data included in the third request, after the request is received, wherein the permitting unit determines a scope of the permission token based on the flow information stored in the first memory unit in association with the app identification information.

BRIEF DESCRIPTION OF THE DRAWINGS

FIGS. 5A to 5D illustrate an exemplary common interface (I/F) and an exemplary unique I/F;

FIG. 6 illustrates an exemplary OAuth-registration information table;

FIG. 7 illustrates an exemplary permission-token information table;

FIG. 8 illustrates an exemplary process content;

FIG. 10 illustrates an exemplary component information table;

FIG. 11 illustrates an exemplary type-conversion information table;

FIG. 12 is a sequence chart of an exemplary storage process of storing permission-token information of the embodiment;

DESCRIPTION OF THE EMBODIMENTS

The object of an embodiment of the present invention is to set an appropriate scope to an application which processes in collaboration with an external service.

Hereinafter, the embodiment of the present invention is described in detail with reference to figures.

<System Structure>

Figure 1:
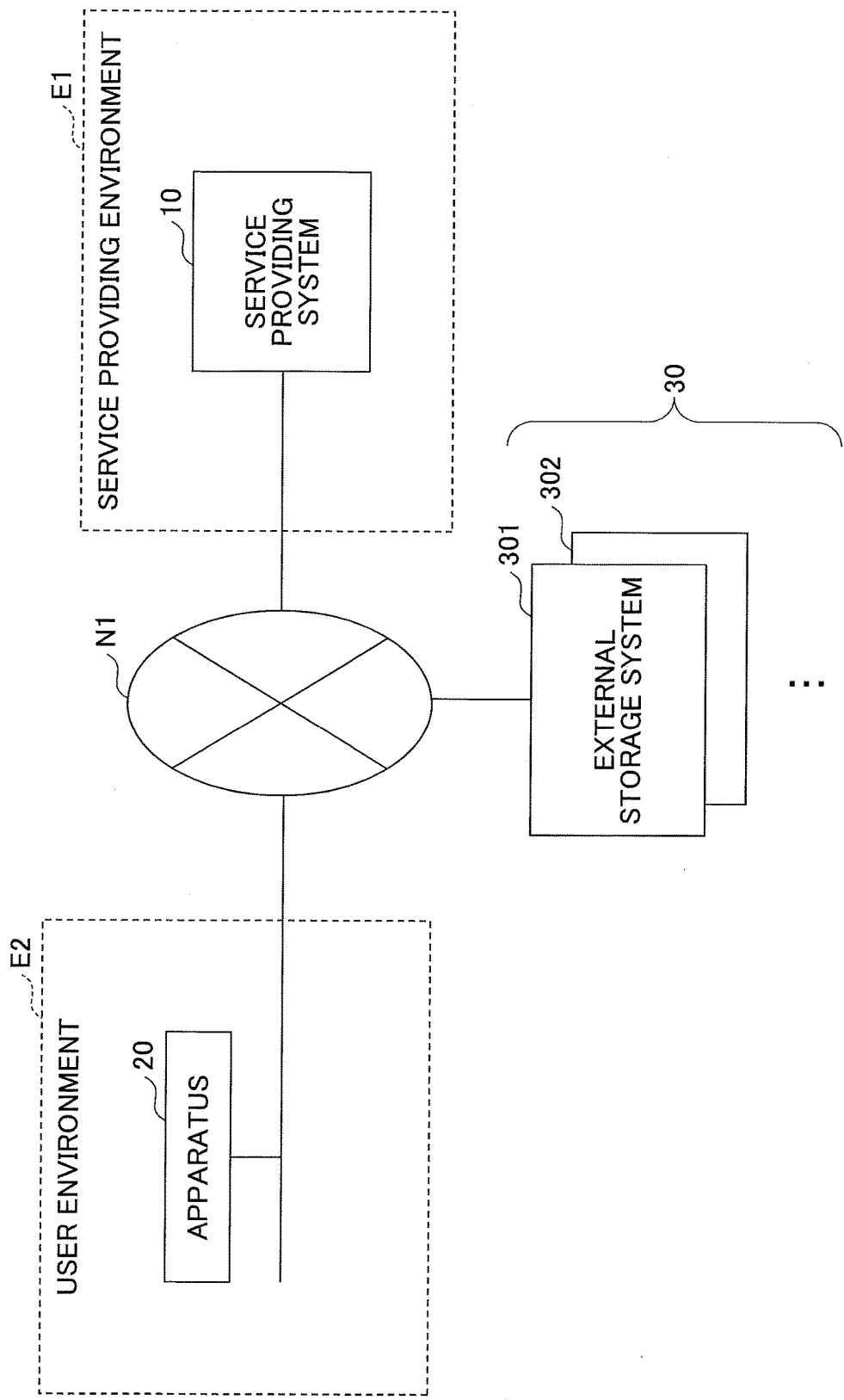
FIG. 1 is a diagram illustrating a system structure of an exemplary information processing system of an embodiment.

Referring to FIG. 1, an information processing system 1 of the embodiment is described. FIG. 1 is a diagram illustrating the system structure of an exemplary information processing system 1 of the embodiment.

The information processing system 1 illustrated in FIG. 1 includes a service providing system 10, an apparatus 20, and an external storage system 30, which are communicably coupled through a wide area network N1 such as the Internet.

The service providing system 10 is implemented by at least one information processing apparatus and provides various services substantialized by a sequence of processes, which collaborate with an external service such as a cloud service through the network N1.

The service provided by the service providing system 10 of the embodiment is specifically described later. Hereinafter, the sequence of processes is referred to as a "process flow".

Although the external service is specifically the cloud service in the embodiment, the external service is not limited to the cloud service. For example, this embodiment may be applied to various external services such as a service provided by an application service provider (ASP) and a web service, which are provided through the network.

The apparatus 20 is various electronic apparatuses used by the user. Said differently, the apparatus 20 is, for example, an image forming apparatus such as a multifunction peripheral (MFP), a personal computer (PC), a projector, an electronic whiteboard, a digital camera, or the like. The user uses the apparatus 20 to use various services provided by the service providing system 10.

Hereinafter, when each of multiple apparatuses 20 are distinguished, a suffix is added such as an "apparatus 201" and an "apparatus 202".

The external storage system 30 is a computer system providing a cloud service called a storage service or an online storage through the network N1. The storage service is a service of lending a memory area of a storage of the external storage system 30.

Hereinafter, when each of multiple external storage systems 30 is distinguished, a suffix is added such as an "external storage system 301" and an "external storage system 302". Further, the name of the storage service provided by the external storage system 301 is a "storage A", and the name of the storage service provided by the external storage system 302 is a "storage B".

The external storage system 30 may be a system implemented by multiple information processing apparatuses.

The structure of the information processing system 1 illustrated in FIG. 1 is an example and may be another structure. For example, the information processing system 1 of the embodiment includes various apparatus, each of which performs at least one of an input and an output of the electronic data. These apparatuses may use various services provided by the service providing system 10.

<Hardware Structure>

Figure 2:
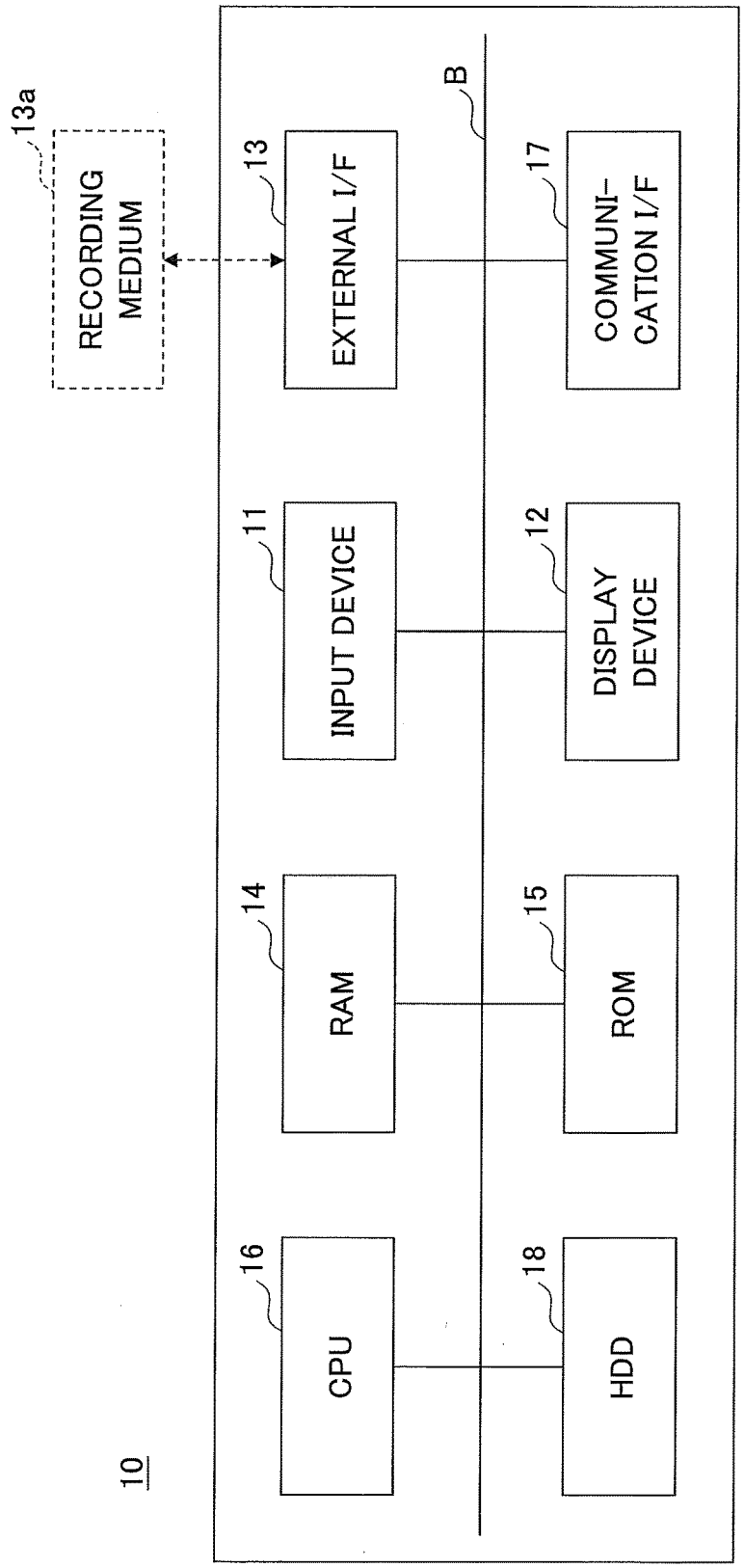
FIG. 2 is a diagram illustrating a hardware structure of an exemplary service providing system of the embodiment.

Referring to FIG. 2, described next is the hardware structure of the service providing system 10 included in the information processing system 10 of the embodiment. FIG. 2 is a diagram illustrating the hardware structure of an exemplary service providing system 10 of the embodiment.

The service providing system 10 illustrated in FIG. 2 includes an input device 11, a display device 12, an external interface (I/F) 13, and a random access memory (RAM) 14. Further, the service providing system 10 includes a read only memory (ROM) 15, a central processing unit (CPU) 16, a communication interface (I/F) 17, and a hard disk drive (HDD) 18. Each of these hardware devices is coupled by the bus B.

The input device 11 includes a keyboard, a mouse, a touch panel, and the like, by which the user input various operation signals. The display device 12 includes a display or the like to display a processed result acquired by the service providing system 10. At least one of the input device 11 and the display device 12 may be in a mode of being coupled to the service providing system 10 so as to be used.

The communication I/F 17 is an interface provided to couple the service providing system 10 with the network N1. Thus, the service providing system 10 can communicate with another apparatus through the communication I/F 17.

The HDD 18 is a non-volatile memory device storing various programs and data. The program and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored program and the stored data using at least one of a predetermined file system and a predetermined database (DB).

The external I/F 13 is an interface with the external apparatus. The external apparatus is a recording medium 13a or the like. With this, the service providing system 10 can read information from the recording medium 13a and write information to the recording medium 13a through the external I/F 13. The recording medium 13a is a flexible disk, a compact disc (CD), a digital versatile disc (DVD), a secure digital (SD) memory card, a universal serial bus (USB) memory, or the like.

The ROM 15 is a non-volatile semiconductor memory which can store a program or data even when a power source is powered off. The ROM 15 stores a program or data such as a basic input/output system (BIOS), an OS setup, a network setup, or the like, which are executed at a time of starting up the service providing system 10. The RAM 14 is a volatile semiconductor memory configured to temporarily store the program or the data.

The CPU 16 reads the program and data from the memory device such as the ROM 15 and the HDD 18. The read program or the read data undergo a process to substantialize a control or a function of the entire service providing system 10.

The service providing system 10 of this embodiment can substantialize various processes described below by having the above hardware structure of the service providing system 10 illustrated in FIG. 2.

Figure 3:
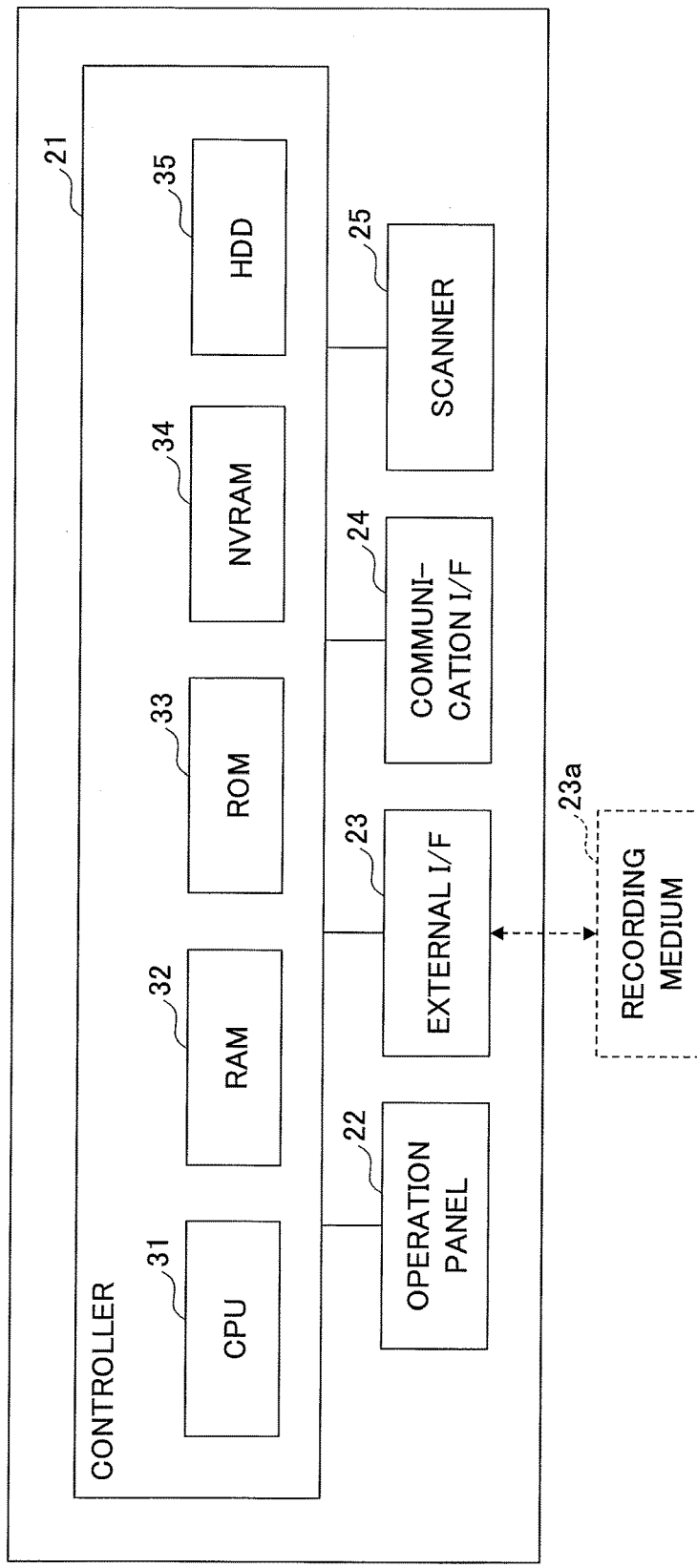
FIG. 3 is a diagram illustrating an exemplary hardware structure of an apparatus of the embodiment.

Referring to FIG. 3, described next is the hardware structure of an image forming apparatus, which is the apparatus 20 included in the information processing system 10 of the embodiment. FIG. 3 is a diagram illustrating an exemplary hardware structure of the apparatus 20 of the embodiment.

The apparatus 20 illustrated in FIG. 3 includes a controller 21, an operation panel 22, an external interface (I/F) 23, a communication I/F 24, a printer 25, and a scanner 26. The controller 21 includes a central processing unit (CPU) 31, a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The RAM 32 is a volatile semiconductor memory configured to temporarily store the programs and the data. For example, setup information or the like is stored in the NVRAM 34. The HDD 35 is an exemplary non-volatile memory device that stores the various programs and data.

The CPU 31 reads the program, the data, setup information, or the like into the RAM 32 from the ROM 33, the NVRAM 34, the HDD 35, or the like, and performs the process. Thus, the CPU 31 is an arithmetic device substantializing an entire control or function of the apparatus 20.

The operation panel 22 includes an input unit configured to receive an input from the user and a display unit configured to display. The external I/F 23 is an interface with the external apparatus. The external apparatus is a recording medium 23a or the like. With this, the apparatus 20 can perform at least one of reading information from the recording medium 23a through the external I/F 23 and writing the information to the recording medium 23a through the external I/F 603. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the apparatus 20 with the network. Thus, the apparatus 20 can perform data communications through the communication I/F 24. The printer 25 is provided to print data. The scanner 26 is a reading device that reads an original and generates an electronic file (an image file).

The service providing system 20 of this embodiment includes a hardware structure illustrated in FIG. 3 to substantialize various processes described below.

<Service Provided by Service Providing System>>

The service provided by the service providing system 10 of the embodiment is described later. Hereinafter, description is given for a case where the apparatus 20 is an image forming apparatus.

For example, the service providing system 10 provides a service (a scan delivery service), in which an electronic file generated by scanning the original in the apparatus 20 is subjected to an optical character recognition (OCR) process and stored in the external storage system 30. Further, for example, the service providing system 10 of the embodiment provides a service (a cloud print service) of printing the electronic file stored in the external storage system 30 by the apparatus 20.

Hereinafter, the description is given for a case where the service providing system 10 provides the scan delivery service.

However, the service provided by the service providing system 10 is not limited to the scan delivery service. For example, the service providing system 10 may provide a service of projecting the electronic file stored in the external storage system 30 by the projector. For example, the service providing system 10 may provide a service of providing the OCR process to the electronic file, which is generated by scanning the original using the apparatus 20, thereafter translating to a predetermined language (for example, translation from English to Japanese), and storing the translated electronic file into the external storage system 30.

<Functional Structure>

Figure 4:
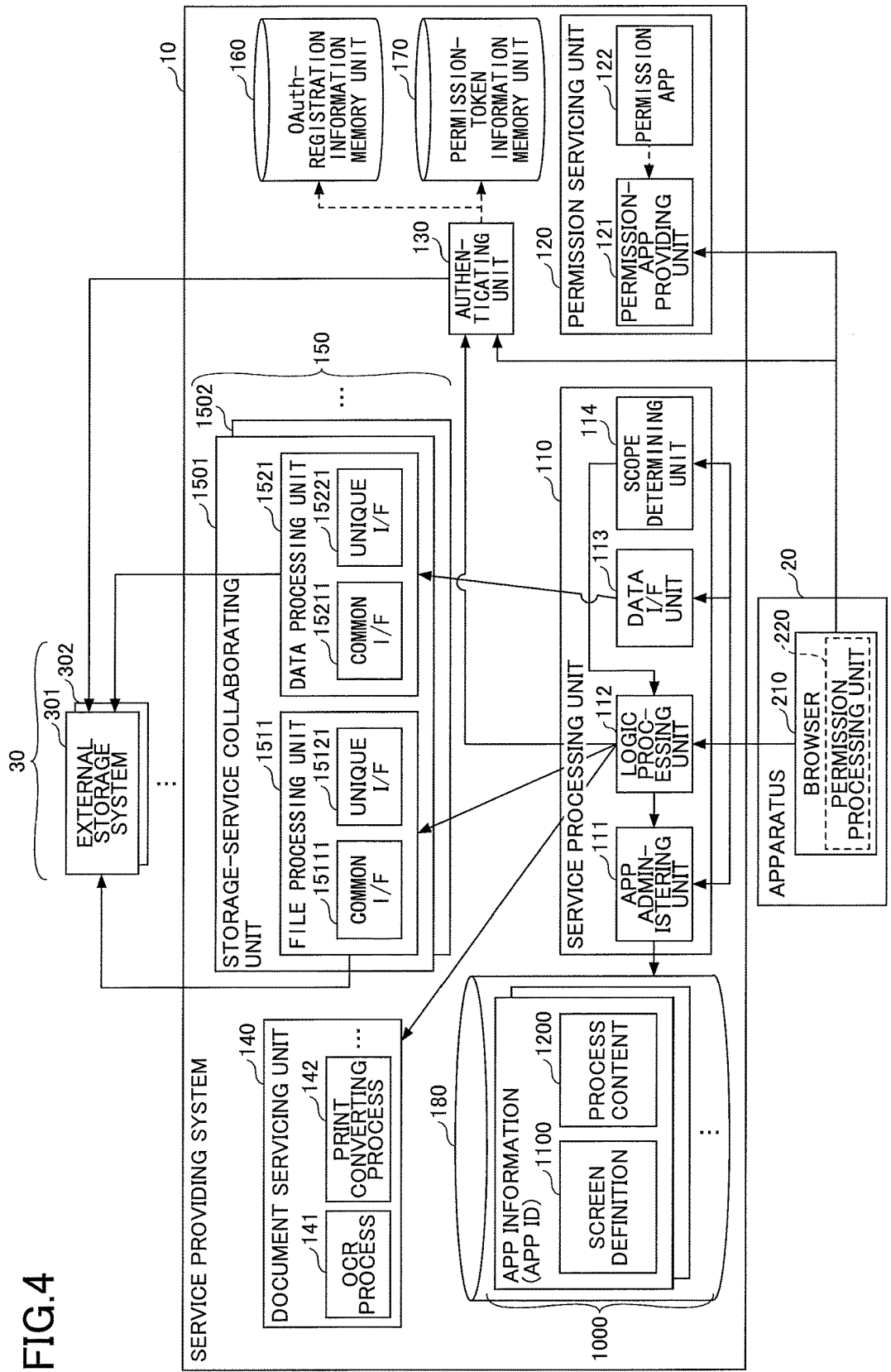
FIG. 4 is a diagram illustrating an exemplary functional structure of the information processing system of the embodiment.

Referring to FIG. 4, the functional structure of the information processing system 1 of the embodiment is described. FIG. 4 is a diagram illustrating the functional structure of an exemplary information processing system 1 of the embodiment.

The apparatus 20 includes a browser 210 executed by the CPU 31. The user of the apparatus 20 can use a service provided by the service providing system 10 through the browser 210.

As such, the browser 210 may be installed on the apparatus 20 of the embodiment. Within the information processing system 1 of the embodiment, a dedicated application, which is to be used by the apparatus 20 in using the service provided by the service providing system 10, may not be developed, for example.

Further, the apparatus 20 includes a permission processing unit 220. The permission processing unit 220 is implemented when a permission app 122 acquired through a permission-app providing unit 121 (described below) is executed on the browser 210. The permission processing unit 220 performs a process related to permission of OAuth (hereinafter, simply referred to as "permission") for the external storage system 30 of app information 1000 (described below) in response to a user operation.

The service providing system 10 includes a service processing unit 110, a permission servicing unit 120, an authenticating unit 130, a document servicing unit 140, and a storage-service collaborating unit 150. These units are implemented when at least one program installed on the service providing system 10 are executed by the CPU 16.

Further, the service providing system 10 includes an OAuth-registration information memory unit 160, a permission-token information memory unit 170, and an app information memory unit 180. These OAuth-registration information memory unit 160, permission-token information memory unit 170, and app information memory unit 180 may be implemented by using the HDD 18. These OAuth-registration information memory unit 160, permission-token information memory unit 170, and app information memory unit 180 may be implemented by using a memory device, which is coupled to the service providing system 10 through the network.

The service processing unit 110 performs a process for substantializing various services provided by the service providing system 10. The service processing unit 110 includes an application administering unit 111, a logic processing unit 112, a data I/F unit 113, and a scope determining unit 114.

An application (app) administering unit 111 administers application information 1000 stored in an app information memory unit 180. The app administering unit 111 returns an app screen formed based on screen definition 1100 included in the app information 1000 in response to a request from the browser 210.

With this, the application screen for using a service provided by the service providing system 10 is displayed on the browser 210 of the apparatus 20. The app information 1000 includes the screen definition 1100 for causing the apparatus 20 to display the above app screen and a process content 1200 indicative of a sequence of processes substantializing the service provided by the app information 1000.

Further, the app administering unit 111 returns the process content 1200 included in the app information 1000 in response to a request from the logic process unit 112. As described above, the process content 1200 is the sequence of processes substantializing the service (for example, the scan delivery service) provided by the service providing system 10. The process content 1200 is described in detail later.

The logic processing unit 112 acquires the process content 1200 included in the app information 1000 through the app administering unit 120 in response to a request received from the browser 210. The logic processing unit 112 requests the document servicing unit, the file processing unit 151, and the authenticating unit 130 to execute the process based on the process content 1200 acquired through the app administering unit 111.

With this, various services provided by the service providing system 10 are substantialized. The logic processing unit 112 is described in detail later.

The data I/F unit 113 sends a predetermined request (for example, a request to acquire a folder view) to a data processing unit 152 of the storage-service collaborating unit 150 in response to a request received from the browser 210.

The scope determining unit 114 determines a scope of permission of the app information 1000 for the external storage system 30. Said differently, the scope determining unit 114 determines the scope of the permission token acquired by the authenticating unit 130 described below. The scope is information specifying a range, in which the app information 1000 can use the resource of the external storage system 30 in the service provided by the app information 1000.

Here, the scope determining unit 114 determines an appropriate scope based on the process content 1200 included in the app information 1000. Therefore, in the service providing system 10 of this embodiment, the user may not explicitly set the scope of the permission token, for example.

The permission servicing unit 120 causes the apparatus 20 to perform the process related to the permission to the external storage system 30 of the app information 1000. The permission servicing unit includes a permission-app providing unit 121 and a permission app 122. The permission-app providing unit 121 provides (sends) the permission app 122 to the browser 210 in response to a request from the browser 210.

The permission app 122 is an application substantialized by, for example, JavaScript ("JavaScript" is a registered trademark). The above-described permission processing unit 220 is implemented when the permission app 122 is executed on the browser 210.

The authenticating unit 130 acquires OAuth registration information from the OAuth-registration information memory unit 160 in response to a request from the permission processing unit 220. The OAuth registration information is, for example, a permission server URL or the like in the external storage system 30 and is set by an administrator or the like of the information processing system 1 for each external storage system 30, The OAuth registration information is described in detail later.

Further, the authenticating unit 130 acquires the permission token from the external storage system 30 in response to a request from the permission processing unit 220. The authenticating unit 130 stores the acquired permission token into the permission-token information memory unit 170.

With this, the service providing system 10 of this embodiment stores the permission token having the scope determined by the scope determining unit 114. Therefore, the service providing system 10 of this embodiment can provide the service substantialized by the sequence of processes performed in collaboration with the external storage system 30 using the stored permission token.

The document servicing unit 140 is a program group of programs (modules) substantializing one process included in the sequence of processes that substantializes the service provided the service providing system 10. The document servicing unit 140 includes an OCR process 141 of executing an OCR process for an electronic file and a print converting process 142 of converting the electronic file to a data format (print data), in which the apparatus 20 can print, for example.

The document servicing unit 140 may include various programs such as a program for compressing or decompressing the electronic file and a program for translating the language, for example.

The storage-service collaborating unit 150 requests the external storage system 30 to execute various processes in response to a request received from the logic processing unit 112 or the data I/F unit 113.

Here, the service providing system 10 includes the storage-service collaborating units 150 respectively for the external storage systems 30. Said differently, the service providing system 10 of the embodiment includes a storage-service A collaborating unit 1501 to request an external storage system 301 to execute the process. In a manner similar thereto, the service providing system 10 of this embodiment includes a storage-service B collaborating unit 1502 to request an external storage system 302 to execute the process.

As described, the service providing system 10 includes the storage-service collaborating units 150 respectively for the external storage systems 30 which process in collaboration with the corresponding storage-service collaborating unit 160. Hereinafter, when the multiple storage-service collaborating units 150 are distinguished, individual units are designated by adding a suffix such as the "storage-service A collaborating unit 1501" and the "storage-service B collaborating unit 1502".

The storage-service collaborating unit 150 includes the file processing unit 151 for receiving a request from the logic processing unit 112 and the data processing unit 152 for receiving a request from the data I/F unit 113.

The file processing unit 151 includes a common I/F 1511 and a unique I/F 1512, in which an application programming interface (API) for conducting an operation (e.g., an acquisition, a storage, and an edit) to the electronic file stored in the external storage system 30 is defined.

The common I/F 1511 is an API used among the multiple external storage systems 30 in common as, for example, the API illustrated in FIG. 5A. Said differently, the common I/F 151 of the file processing unit 151 is an API group of APIs for using a function (e.g., a file acquisition, and a file storage), which is related to a file operation and can be used by all the external storage systems 30.

On the other hand, the unique I/F 1512 is an API used by a specific external storage system 30 as, for example, the API illustrated in FIG. 5B. Said differently, the unique I/F 1512 of the file processing unit 151 is an API group of APIs for using a function (e.g., a file edit), which is related to the file operation and can be used by the specific external storage system 30.

Therefore, the common I/F 1511 is defined in a manner similar to all the storage-service collaborating units 150. Meanwhile, the unique I/F 1512 is defined for the specific storage-service collaborating unit 150, in which the API defined by the unique I/F 1512 can be used.

On the other hand, the data processing unit 152 includes a common I/F 1521 and a unique I/F 1522, in which an API for acquiring meta data (e.g., an file view, and a folder view) of bibliographic information of the electronic file stored in the external storage system 30 is defined.

The common I/F 1512 is an API used among the multiple external storage systems 30 in common as, for example, the API illustrated in FIG. 5C. Said differently, the common I/F 1521 of the data processing unit 152 is an API group of APIs for using a function of a meta data acquisition, which can be used by all the external storage systems 30.

On the other hand, the unique I/F 1522 is an API used by a specific external storage system 30 as, for example, the API illustrated in FIG. 5D. Said differently, the unique I/F 1522 of the data processing unit 152 is an API group of APIs for using a function of a metadata acquisition (e.g., an acquisition of the image file view), which can be used by a specific external storage system 30.

Therefore, the common I/F 1521 is defined in a manner similar to all the storage-service collaborating units 150. Meanwhile, the unique I/F 1522 is defined for the specific storage-service collaborating unit 150, in which the API defined by the unique I/F 1522 can be used.

Here, a software development kit (SDK) may be used to add the storage-service collaborating unit 150.

Here, the API defined by the common I/F 1511 and the unique I/F 1512, which are illustrated in FIGS. 5A-5D, can be used by designating an "external service name (a storage service name)". Said differently, the "storage service name" is defined as a variable portion. This situation is similarly applicable to the common I/F 1521 and the unique I/F 1522.

The OAuth-registration information memory unit 160 stores an OAuth-registration information table 1600, in which OAuth registration information is stored. Here, referring to FIG. 6, the OAuth-registration information table 1600 is described in detail. FIG. 6 illustrates an exemplary OAuth-registration information table.

The OAuth-registration information stored in the OAuth-registration information table 1600 includes data items such as an external service identification data (ID), a client ID, a client secret, a permission server URL, and a redirect destination URL.

The external service ID is identification information uniquely identifying the external storage system 30. Therefore, the OAuth registration information associating the client ID, the client secret, the permission server URL, and the redirect destination URL, which are used for the permission of OAuth for each of the external storage systems 30.

A permission-token information memory unit 170 stores a permission-token information table 1700, in which permission token information is stored. Here, referring to FIG. 7, the permission-token information table 1700 is described in detail. FIG. 7 illustrates an exemplary permission-token information table.

The permission-token information table 1700 illustrated in FIG. 7 includes data items such as a user ID, an app ID, the external service ID, the permission token, the scope, and an expiration date.

The user ID is identification information uniquely identifying the user of the service providing system 10. The app ID is identification information uniquely identifying the app information 1000. Therefore, the permission token information associates the permission token of the external storage system 30, the scope of this permission token, and the expiration date of the permission token, for each user and each of the app information 1000.

The app information memory unit 180 stores the app information 1000 for providing the service to the apparatus 20. The app information 1000 includes the screen definition 1100 for causing the apparatus 20 to display an app screen and the process content 1200 indicative of the sequence of processes substantializing the service to be served to the apparatus 20.

The app information is associated with the app ID for uniquely identifying this app information 1000. Within this embodiment, the app information 1000 for providing the service (Scan to storage service A) in collaboration with the storage service A is designated as "app information 1000A", and the app ID of the app information 1000A is designated as "app001".

Within this embodiment, the description is given for a case where the app information includes one screen definition 1100 and one process content. However, the embodiment is not limited to this case and may include multiple screen definitions or multiple process contents.

Referring to process content 1200A included in app information 1000A is described in detail. FIG. 8 illustrates an exemplary process content.

The process content 1200A illustrated in FIG. 8 illustrates a sequence of processes that causes an input electronic file to be provided with the OCR process, thereafter acquires the permission token of the storage service A, and delivers (uploads) the permission token to the storage service.

Said differently, in a process 1201A, the electronic file is input. In a process 1202A, the input electronic file is subjected to an OCR process. Similarly in a process 1203A, the permission token of the storage service A is acquired. In a process 1204A, the permission token is delivered to the storage service A.

With this, the service providing system 10 causes the apparatus 20 to provide the electronic file generated by scanning with the OCR process, and thereafter the scan delivery service of delivering to the storage service A can be substantialized.

The execution order of the processes defined in the process content 1200A illustrated in FIG. 8 is sequential from top down. Said differently, in the sequence of processes (a process flow) based on the process content 1200A illustrated in FIG. 8, the processes are executed in an order of the process defined in the process 1201A, the process defined in the process 1202A, the process defined in the process 1203A, and the process defined in the process 1204A. However, the sequence of processes is not limited to this order, and information indicative of the execution order of the processes may be defined.

Figure 9:
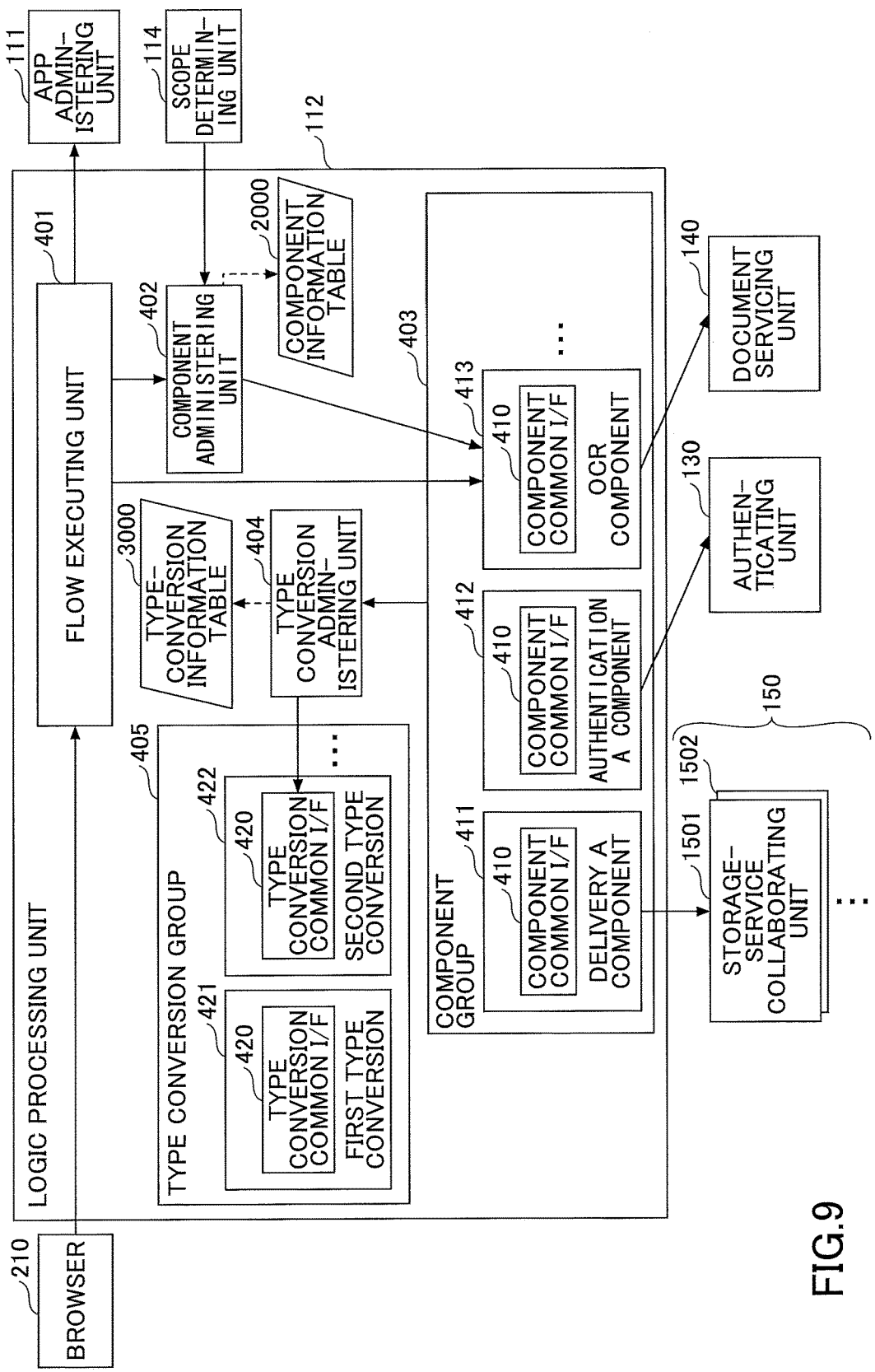
FIG. 9 is a processing block diagram of an exemplary logic processing unit of the embodiment.

Next, referring to FIG. 9, a detailed functional structure of the logic processing unit 112 of the embodiment is described. FIG. 9 is a diagram illustrating the functional structure of an exemplary information processing unit 112 of the embodiment.

The logic processing unit 112 of the embodiment includes a flow executing unit 401, a component administering unit 402, a component group 403 of components, a type conversion administering unit 404, and a type conversion group 405. Further, the logic processing unit 112 of the embodiment uses a component information table and a type-conversion information table 3000.

The flow executing unit 401 receives an execution request to execute a process from the browser 210, and then acquires the process content 1200 included in the app information 1000 through the app administering unit 111. Then, the flow executing unit 401 requests the component to execute the process in accordance with the acquired process content 1200.

Here, the component is a module or the like for executing one process from among the sequence of processes indicated by the process content 1200, and is defined by, for example, a class, a function, or the like. Said differently, the sequence of processes indicated by the process content 1200 is substantialized by the processes executed by the component.

The component administering unit 402 generates the component in response to the request from the flow executing unit 401. Here, the generation of the component means that the component defined by, for example, the class is deployed on the memory (for example, the RAM 14).

Further, the component administering unit 402 returns component information stored in the component information table 2000 in response to a request from the scope determining unit 114. Here, referring to FIG. 10, the component information table 2000 is described in detail. FIG. 10 illustrates a structural example of the component information table.

The component information stored in the component information table 2000 illustrated in FIG. 10 includes data items of a component name, the external service name, and the scope. Said differently, the component information is associated with the scope, which is of the external storage system and is used by each of the components in executing the process.

For example, the component name "delivery A component" is associated with the scope "aa" in the external storage system 301 of the external service ID "service-a". This indicates that the scope of the permission token of the external storage system 301 is "aa" in order to execute the component having the component name "delivery A component".

The scope is not set to the OCR component and the authentication A component. This is because these components do not use a resource of the external storage system 30 or use a resource which can be used without permission.

The component group 403 is a set of the components. The component group 403 includes a delivery A component 411 for delivering the electronic file to the external storage system 301 (the storage service A) and an authentication A component 412 for acquiring the permission token of the storage service A. Further, the component group 403 includes an OCR component 413 for providing the OCR process to the electronic file.

Additionally, the component group 403 includes a delivery B component for delivering the electronic file to an external storage system 302 (a storage service B) and a print conversion component for converting the electronic file to print data, for example.

Further, these components include a component common I/F 410. The component common I/F 410 is an API defined for each component in common, and includes an API for generating the component and an API for requesting the component to execute the process.

As described, it is possible to localize an influence caused by the addition of the component because each component has the corresponding component common I/F 410. Said differently, the component can be added without influencing the flow executing unit 401 and the component administering unit 402. Therefore, the service providing system 10 of the embodiment can reduce a man-hour for a development such as an addition of the component.

The type conversion administering unit 404 administers a type conversion of the data type. A data type which can be handled by each component is previously determined. Therefore, the type conversion administering unit 404 generates a type conversion defined in the type conversion group 405 by referring to the type-conversion information table 3000 in response to a request from the component. The type conversion administering unit 404 requests to execute a type conversion process for the generated type conversion.

Here, the type conversion is a module for executing the type conversion process of the data type, and is defined by, for example, a class, a mathematical function, or a like.

Here, referring to FIG. 11, the type-conversion information table 3000 is described in detail. FIG. 11 illustrates an exemplary type-conversion information table.

Type conversion information stored in the type-conversion information table 3000 illustrated in FIG. 11 includes data items of a data type before conversion, a data type after conversion, and a type conversion to be generated. Said differently, the type conversion information is associated with the type conversion to be generated for converting the data type before the conversion to the data type after the conversion for each of the data type before conversion and the data type after conversion.

Therefore, in a case where data are converted from a data type "InputStream" indicative of stream data to a data type "LocalFilePath" indicative of a path (an address) of an electronic file stored in the memory device or the like, it is indicated that a first type conversion is generated.

Here, the generation of the type conversion means that the type conversion defined by, for example, the class is deployed on the memory (for example, the RAM 14). The data type is "File" indicative of the entity of the electronic file in addition to the above-described "InputStream" and "LocalFilePath".

The type conversion group 405 is a set of the type conversions. The type conversion group 405 includes a first type conversion converting data of the data type "InputStream" to data of the data type "LocalFilePath". The type conversion group 405 includes a second type conversion converting data of the data type "LocalFilePath" to data of the data type "File".

Further, each of these type conversions include a type conversion common I/F 420. The type conversion common I/F 420 is an API defined for each type conversion in common, and includes an API for generating the type conversion and an API for requesting the type conversion to execute the process.

As described, it is possible to localize an influence caused by the addition of the type conversion when each type conversion has the type conversion common I/F 420. Said differently, it is possible to add the type conversion without influencing the type conversion administering unit 404 or the like. Therefore, the service providing system 10 of the embodiment can reduce a man-hour for a development such as an addition of the type conversion.

<Detailed Process>

Described next is a detailed process of the information processing system of this embodiment.

Referring to FIG. 12, a process that the user permits the app information 1000 is described. FIG. 12 is a sequence chart of an exemplary storage process of storing permission token information of the embodiment.

At first, the user operates to permit the app information 1000 through the browser 210. Then, the browser 210 requests the permission-app providing unit 121 to acquire the permission app (step S1201). Then, the permission-app providing unit 121 returns the permission app 12 to the browser 210.

The browser 210 executes the acquired permission app 122 on the browser 210 (step S1202). With this, the permission processing unit 220 is generated.

Next, the permission processing unit 220 requests the app administering unit 111 to acquire an app view (step S1203). The application administering unit 111 returns the app view. The app view is a view of bibliographic information of the app information 1000 stored in the app information memory unit 180, and includes the service name and app ID, which are provided by the app information 1000.

Figure 13:
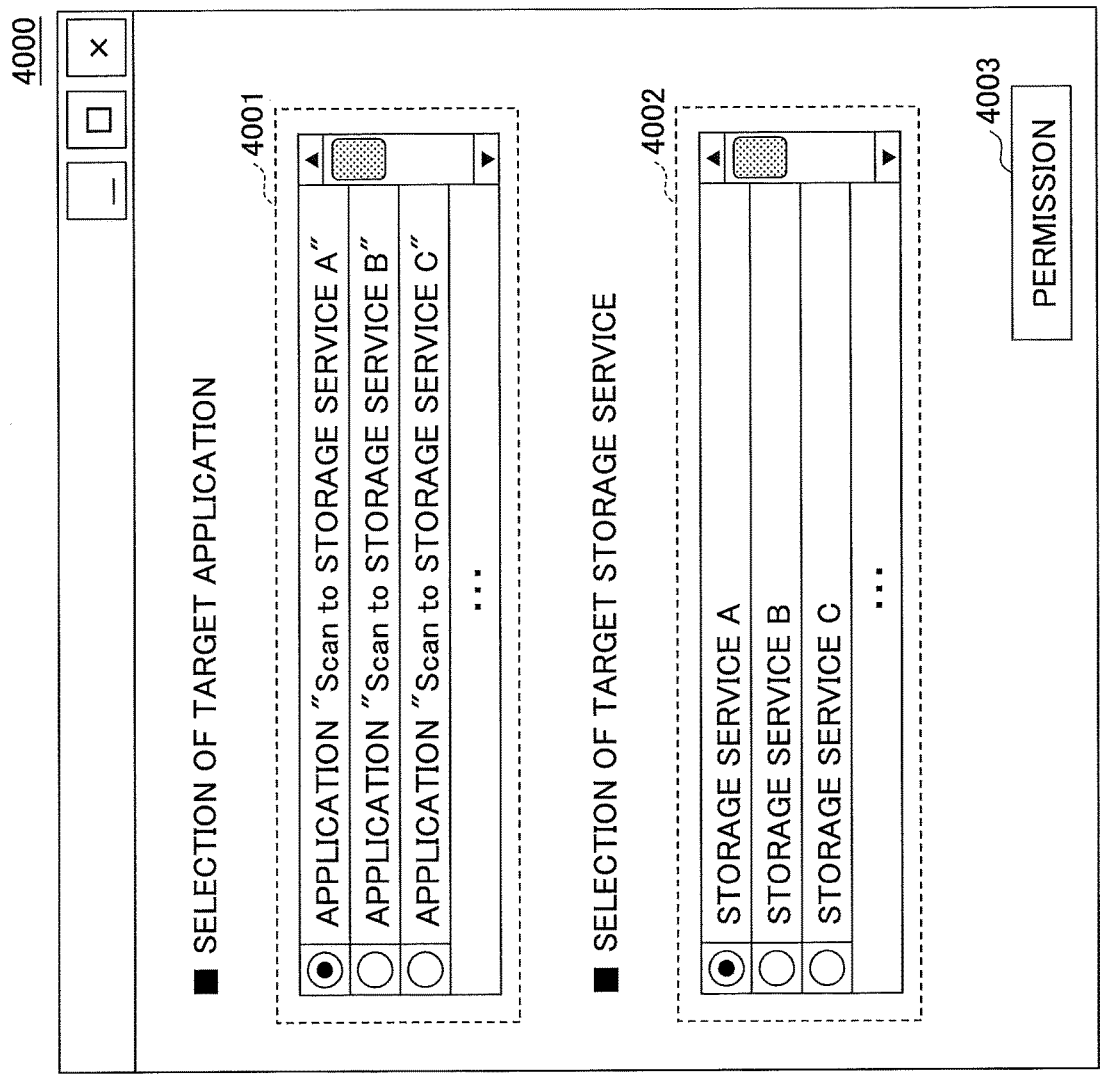
FIG. 13 illustrates an exemplary permission screen.

In receipt of the app view, the browser 210 causes a permission screen 4000 illustrated in, for example, FIG. 13 to be displayed (step S1204). Here, the permission screen 4000 includes an application view 4001 displayed based on the app view received from the app administering unit 111, and a storage service view 4002 for selecting the storage service. Further, the permission screen 4000 includes a permission button 4003 for permitting the application selected from the application view 4001 by the storage service selected from the storage service view 4002.

The application view 4001 displays a view of application names of the app information 1000. For example, the application view 4001 displays the application name of "Scan to storage service A" application of app information 1000A or the like.

The storage service view 4002 displays a view of the storage service names provided by the external storage system 30. For example, the storage service view 4002 displays the "storage service A" provided by the external storage system 301, the "storage service B" provided by the external storage system 302, and so on.

On the permission screen 4000 illustrated in FIG. 13, the user selects the application and the storage service, which are permission targets, respectively from the application view 4001 and the storage service view 4002, and the permission button 4003 is operated to be pushed down. Then, the browser 210 receives this operation and requests the permission processing unit 220 to permit he selected application (step S1205).

The permission request includes the app ID of the application selected by the user from the application view 4001 and an external service ID of the storage service selected by the user from the storage service view 4002.

Hereinafter, the description is given to a case where the user selects the "Scan to storage service A" application and the "storage service A" respectively from the application view 4001 and the storage service view 4002, and the permission button 4003 is pushed down. In this case, the permission request includes the app ID "app001" of the app information 1000A and the external service ID "service_a" of the external storage system 301.

However, the storage service view 4002 may display the storage services processed in collaboration with the selected application so as to be selectable in response to the application selected from the application view 4001. For example, in a case where the application processed in collaboration with the storage service A and the storage service C are selected from the application view 4001, the storage service view may display the storage service A and the storage service C so as to be selectable.

The permission processing unit 220 receives the permission request and thereafter requests the scope determining unit 114 to acquire the scope (step S1206). The acquisition request includes the app ID "app001" and the external service ID "service_a" of the external storage system 301.

The scope determining unit receives the acquisition request to acquire the scope, and then requests the app administering unit 111 to acquire the process content (step S1207). Here, this acquisition request to acquire the process content includes the app ID "app001".

The app administering unit 111 receives the acquisition request to acquire the process content, and then returns the process content 1200 included in the app information 1000 of the app ID included in the acquisition request. Said differently, the app administering unit 111 returns the process content 1200A included in the app information 1000A of the app ID "app001".

Next, the scope determining unit 114 requests the logic processing unit 112 to acquire the component information table 2000 (step S1208). Then, the logic processing unit 112 returns the component information table 2000.

Subsequently, the scope determining unit 114 determines the scope based on the process content 1200A acquired in step S1207 and the component information table 2000 acquired in step S1208 (step S1209). Then, the scope determining unit 114 returns the determined scope to the permission processing unit 220.

Said differently, the sequence of processes indicated by the process content 1200A is executed by an OCR component 413 corresponding to the process 1202A, an OCR component 412 corresponding to the process 1203A, and an OCR component 411 corresponding to the process 1204A.

In the component information table 2000, the scope is not set to the OCR component 413 and the authentication A component 412. On the other hand, in the component information table 2000, the scope "aa" is set the delivery A component 411.

Therefore, the scope determining unit 114 determines the scope of the app information 1000A to be "aa". As described, the scope determining unit 114 determines, as the scope of the app information 1000, the sum of the scopes set to each component that executes the sequence of processes indicated by the process content 1200 included in the app information 1000 as the scope of the app information 1000.

Figure 14:
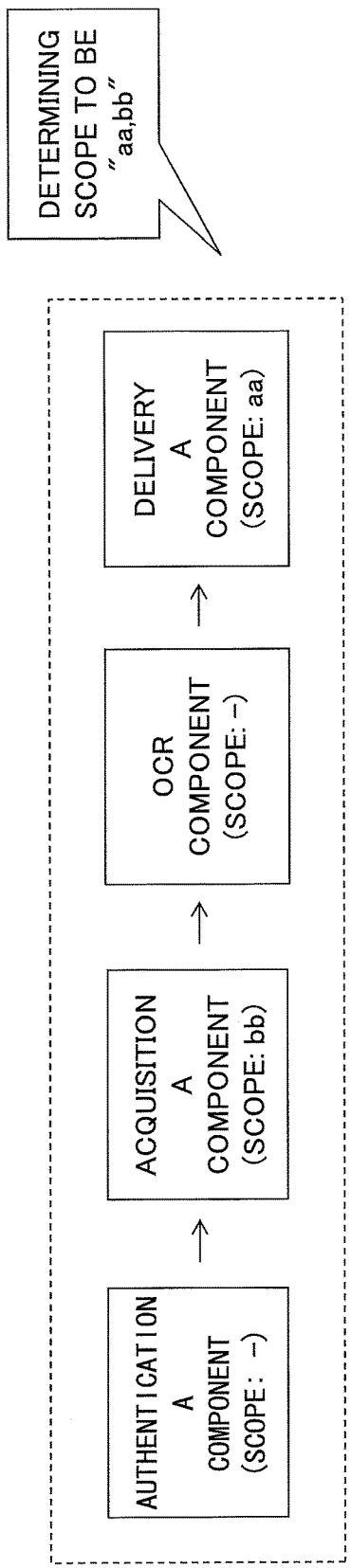
FIG. 14 is a diagram explaining another example of determining the scope.

Here, referring to FIG. 14, another example of determining the scope is described. FIG. 14 is a diagram explaining another example of determining the scope.

For example, referring to FIG. 14, the sequence of processes indicated by the process content 1200 is executed by the authentication A component, the acquisition A component, the OCR component, and the delivery A component. Further, for example, the scopes of these components are respectively "-", "bb", "-", and "aa", in the component information table 2000. In this case, the scope determining unit 114 determines the scope of the app information 1000 including the process content 1200 as "aa,bb".

As described, the scope determining unit 114 determines, as the scope of the application, the sum of the scopes previously set to the components executing the processes included in the sequence of processes. Therefore, in the service providing system 10 of the embodiment, the scope of the application can be appropriately set (said differently, in a necessary and sufficient range).

Referring back to FIG. 12, the permission processing unit 220 requests the authenticating unit 130 to acquire the OAuth registration information (step S1210). The acquisition request to acquire the OAuth registration information includes the external service ID "service_a" of the external storage system 301, with which the application (the app information 1000A of the app ID "app001") selected by the user processes in collaboration.

After the permission processing unit 220 receives the OAth registration information, the permission processing unit 220 causes the browser 210 to redirect to the permission server URL "http://www.OOO.com/auto" included in the permission server URL. Here, the permission server URL is a URL of an authentication screen (for example, a login screen) for performing the authentication for the corresponding external storage system 30.

Next, the user inputs authentication information (for example, a user ID and a password of the external storage system 301) for the authentication onto the authentication screen to authenticate. Then, the authenticating unit 130 requests the external storage system 301 to authenticate (step S1211). This authentication request of requesting the external storage system 301 to authenticate includes authentication information.

The external storage system 301 receives the authentication request and thereafter returns an authenticated result to the authentication request. Hereinafter, an explanation is given for a case where the external storage system 301 returns the authenticated result of the successful authentication.

Next, after the permission processing unit 220 receives the authenticated result indicative of the successful authentication, the permission processing unit 220 requests the external storage system 301 to permit the app information 1000A (step S1211). Here, the permission request of requesting the external storage system 301 to permit the app information 1000A includes the scope "aa" returned from the scope determining unit 114, and the client ID and the redirect destination URL, which are included in the OAuth registration information acquired in step S1210.

Further, the external storage system 301 issues a permission code indicative of a permission response to the permission request and causes the browser 210 to redirect to the redirect destination URL.

Figure 15:
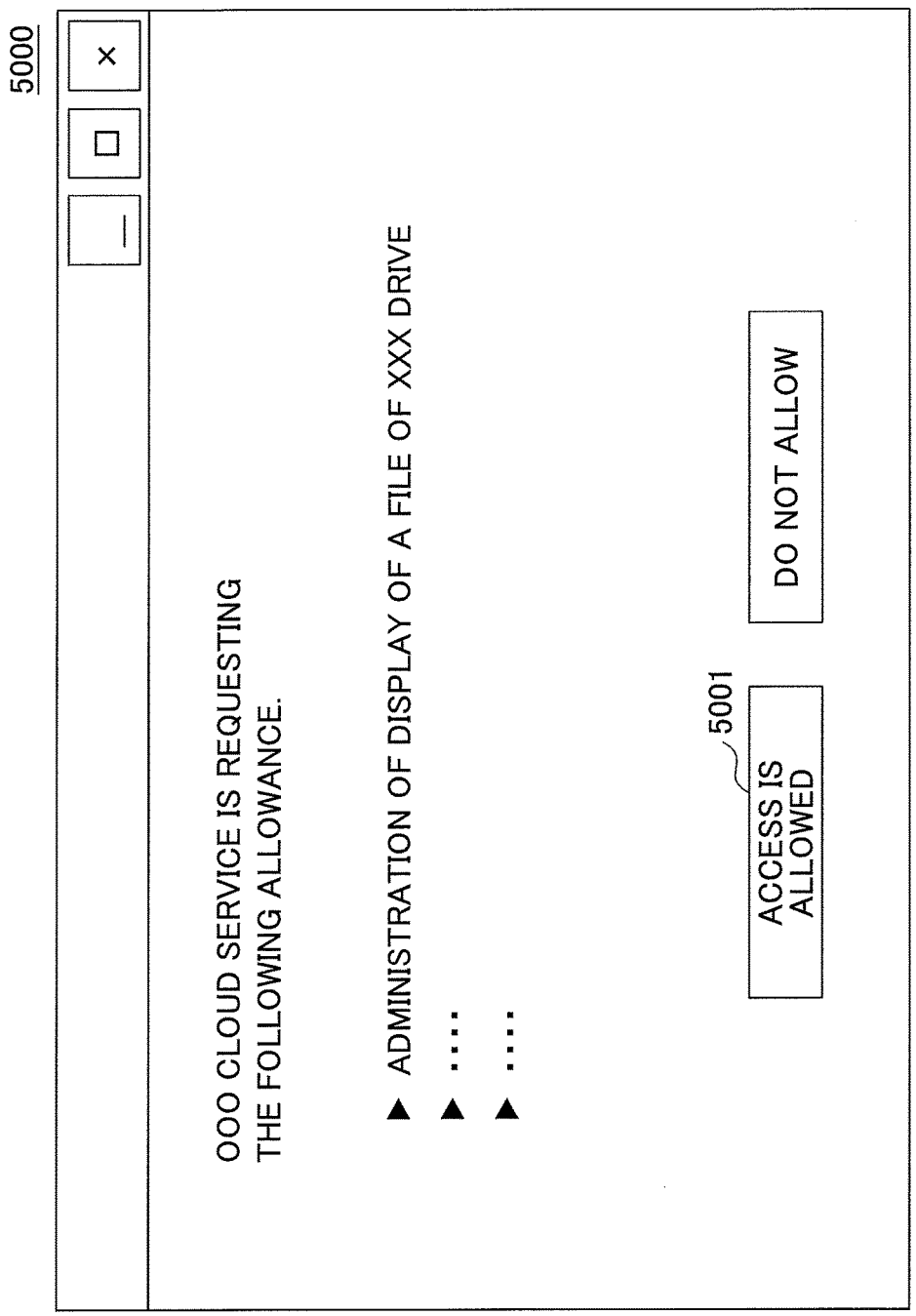
FIG. 15 illustrates an exemplary confirmation screen.

After the authentication is successfully completed, a confirmation screen 5000 illustrated in, for example, FIG. 15 may be displayed. The confirmation screen 5000 illustrated in FIG. 15 is provided to make the user confirm that the service providing system 10 uses the resource within a range set by the scope in the external storage system 30. Further, the permission request in step S1212 may be sent to the corresponding external storage system 30 in a case where a button 5001 of "access is allowed" is pushed by the user in this external storage system 30.

Next, the permission processing unit 220 sends the permission code acquired in step S1212 to the authenticating unit 130 (step S1213). At this time, the permission processing unit 220 sends the external service ID "service_a" to the authenticating unit 130.

Subsequently, after the authenticating unit 130 receives the permission code and the external service ID, the authenticating unit 130 requests the external storage system 301 indicated by the external service ID "service_a" to acquire the permission token (step S1214). The acquisition request of requesting to acquire the permission token includes the above permission code, and the client ID and the client secret, which are associated with the external service ID in the OAuth registration information.

Then, the external storage system 301 returns the permission token and the expiration date of this permission token. At this time, the external storage system 301 may additionally return a refresh token to acquire again the permission token in a case where the expiration date of the permission token elapses.

The authenticating unit 130 receives the permission token and the expiration date, and thereafter the authenticating unit 130 stores the permission token and the expiration date in the permission-token information table 1700 (step S1215).

Then, the authenticating unit 130 stores the permission token and the expiration date in association with a scope determined using the user ID, the app ID of the app information 1000 being the permission target, the external service ID of the external storage system processing in collaboration with the authenticating unit 130, and the scope determines by the scope determining unit 114.

As described above, the service providing system 10 of this embodiment can perform the permission process in the external storage system 30 of the application (the app information 1000) selected by the user. Further, in the service providing system 10 of the embodiment, the scope of the permission token can be appropriately set based on the process content 1200 included in the app information 1000.

Therefore, the service providing system 10 can prevent a situation where the range of the scope is too narrow to execute the sequence of processes based on the app information 1000 from occurring, for example. Similarly, the service providing system 10 of the embodiment can prevent a situation where the range of the scope is too wide to generate an access to a resource in the sequence of processes based on the app information 1000 despite the intention of the user from occurring.

Figure 16:
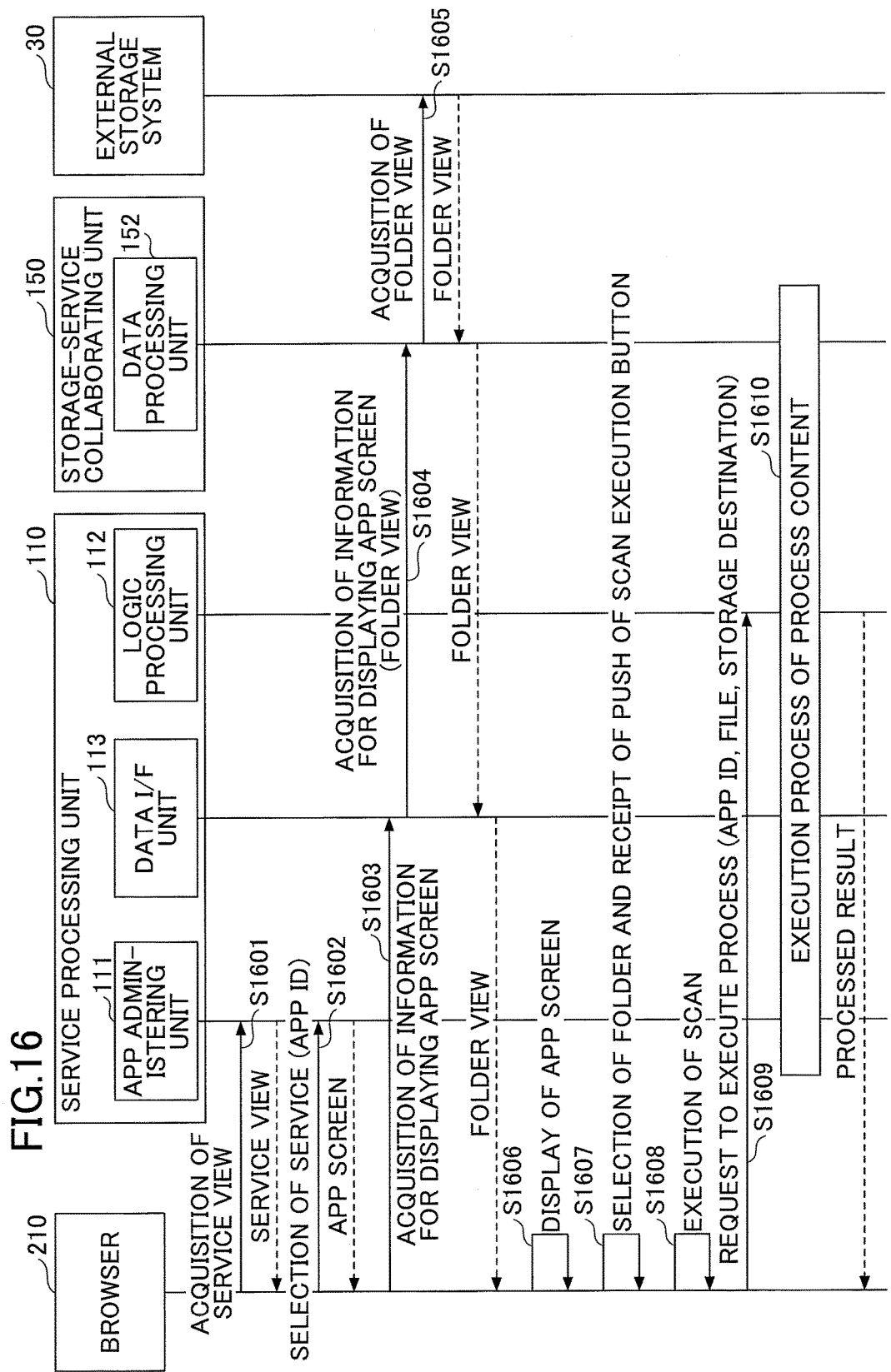
FIG. 16 is a sequence chart of an exemplary overall process of a scan delivery service of the embodiment.

Referring to FIG. 16, described is a process in a case where the user uses the scan delivery service with the apparatus 20 in collaboration with the storage service A. FIG. 16 is a sequence diagram of an exemplary overall process of the scan delivery service of this embodiment.

At first, the user conducts an operation of acquiring a service view provided by the service providing system 10 by using the browser 210. Then, the browser 210 requests the app administering unit 111 to acquire the service view (step S1601).

After the app administering unit 111 receives the acquisition request of acquiring the service view, the app administering unit 111 returns the service view provided by the service providing system 10. With this, the service view of services provided by the service providing system 10 is displayed on the operation panel 22 by the browser 210 of the apparatus 20. For example, the service view includes the service and the app ID of the app information 1000 for providing the service of the service name.

The user selects the service desired to be used by the user from the service view displayed on the operation panel 22 of the apparatus 20. Then, the browser 210 sends the application ID of the app information 1000 for providing the service selected by the user to the application administering unit 111 (step S1602). Hereinafter, description is given for a case where the user selects the service name "Scan to storage service A". Therefore, the browser 210 sends the application ID "app001" of the app information 1000A to the app administering unit 111.

Then, the application administering unit 111 generates the application screen in the hypertext markup language (HTML) format based on the screen definition included in the app information 1000A having the app ID "1000A" received from the browser 210 and sends the generated app screen to the browser 210.

When the browser 210 receives the app screen from the app administering unit 111, the browser 210 requests the data I/F unit 113 to acquire information to be displayed (step S1603). The information to be displayed is, for example, selectable elements in a selection box included, for example, the app screen. Said differently, within the embodiment, the browser 210 requests the data I/F unit 113 to acquire a folder view of the storage service A, which is a delivery destination (a storage destination) of the scan delivery.

Next, after the data I/F unit 113 receives an acquisition request of requesting to acquire the information to be displayed, the data I/F unit 113 sends the acquisition request to the data processing unit 152 of the storage-service collaborating unit 152 corresponding to this acquisition request (step S1604). Said differently, the data I/F unit 113 sends the acquisition request of requesting to acquire the information to be displayed to a data I/F unit 1131 of a storage-service A collaborating unit 1501.

Next, after the data processing unit 152 receives the acquisition request of requesting to acquire the information to be displayed from the data I/F unit 113, the data processing unit 152 sends a process request corresponding to the acquisition request to the corresponding external storage system 30 (step S1605). Said differently, a data processing unit 1521 sends the acquisition request of requesting to acquire the folder view to the external storage system 301. Then, the browser 210 receives the folder view through the storage-service A collaborating unit 1501.

The folder view acquired as described above is information of the folder name, the folder ID, or the like of the storage service A to be a storage destination of the electronic file in the scan delivery service in collaboration with the storage service A.

Figure 17:
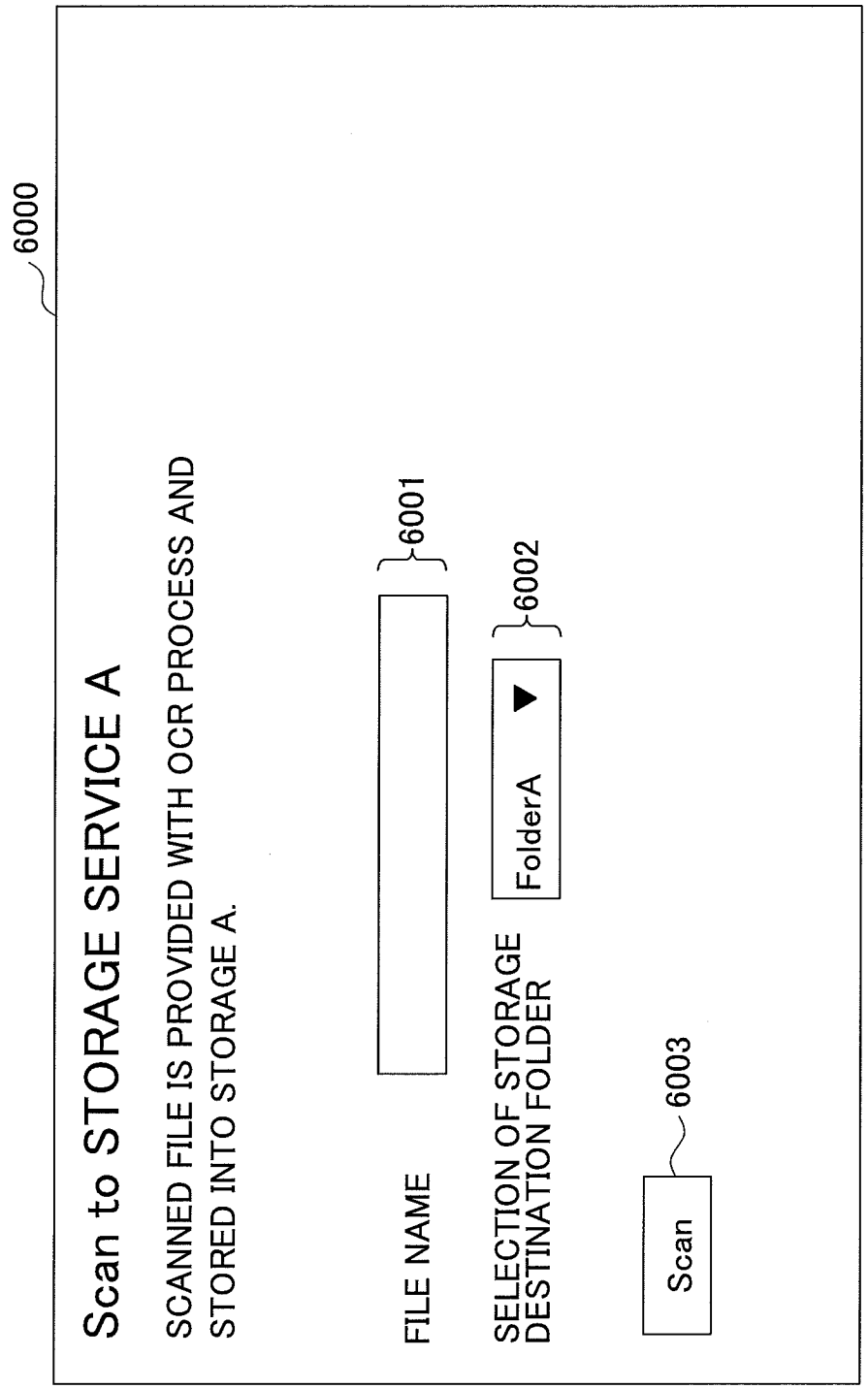
FIG. 17 illustrates an exemplary application (app) screen for using the scan delivery service.

Next, the browser 210 causes the operation panel 22 to display the app screen 6000 illustrated in FIG. 17 based on the app screen acquired from the app administering unit 111 in step S1602 and the above-acquired folder view (step S1606).

The app screen 6000 illustrated in FIG. 17 is provided for using the scan delivery service (Scan to storage service) collaborating with the storage service A. The app screen 6000 includes a file name input box 6001, a storage destination folder selection box 6002, and a scan execution button 6003.

The file name input box 6001 is provided to input the file name given to the image data (the electronic file) generated by scanning in the apparatus 20. The storage destination folder selection box 6002 is provided to select a folder at the storage destination storing the electronic file in the storage service A and is generated by the browser 210 based on the above-acquired folder view. The scan execution button 6003 is provided to execute scanning in the apparatus 20 to start use of the service.

The user inputs a desired file name into the file name input box 6006 on the app screen 6000 illustrated in FIG. 17 and selects a desired storage destination folder in the storage destination folder selection box 6002. Then, an original is set to the scanner 26 to the apparatus 20 and the scan execution button 6003 is pushed. Then, the browser receives these operations (step S1607).

Hereinafter, description is given for a case where the user inputs a file name "test" into the file name input box 6001, a folder "FolderA" is selected in the storage destination folder selection box 6002, and thereafter the scan execution button 6003 is pushed. With this, the original is read by the scanner 26 of the apparatus 20 and the electronic file is generated (step S1608).

Next, the browser 210 requests the logic processing unit 112 to execute the process of the scan delivery service in collaboration with the storage service A (step S1609). This execution request of requesting the logic processing unit 112 to execute the process of the scan delivery service includes the app ID "app001" of the app information, the electronic file generated in step S1608, and a folder ID "folder_id_b" of the storage destination folder "FolderB" of the storage service A.

Subsequently, after the logic processing unit 112 receives the execution request of the process, the logic processing unit 112 performs the execution process of the process content 1200 included in the app information 1000 of the app ID included in the execution request (step S1610). Said differently, the logic processing unit 112 conducts the execution process of the process content 1200A included in the app information 1000A of the app ID "app001". With this, the electronic file (the electronic file generated by scanning is provided with the OCR process) having the file name of "test" is stored in the folder name "FolderB" of the storage service A.

Figure 18:
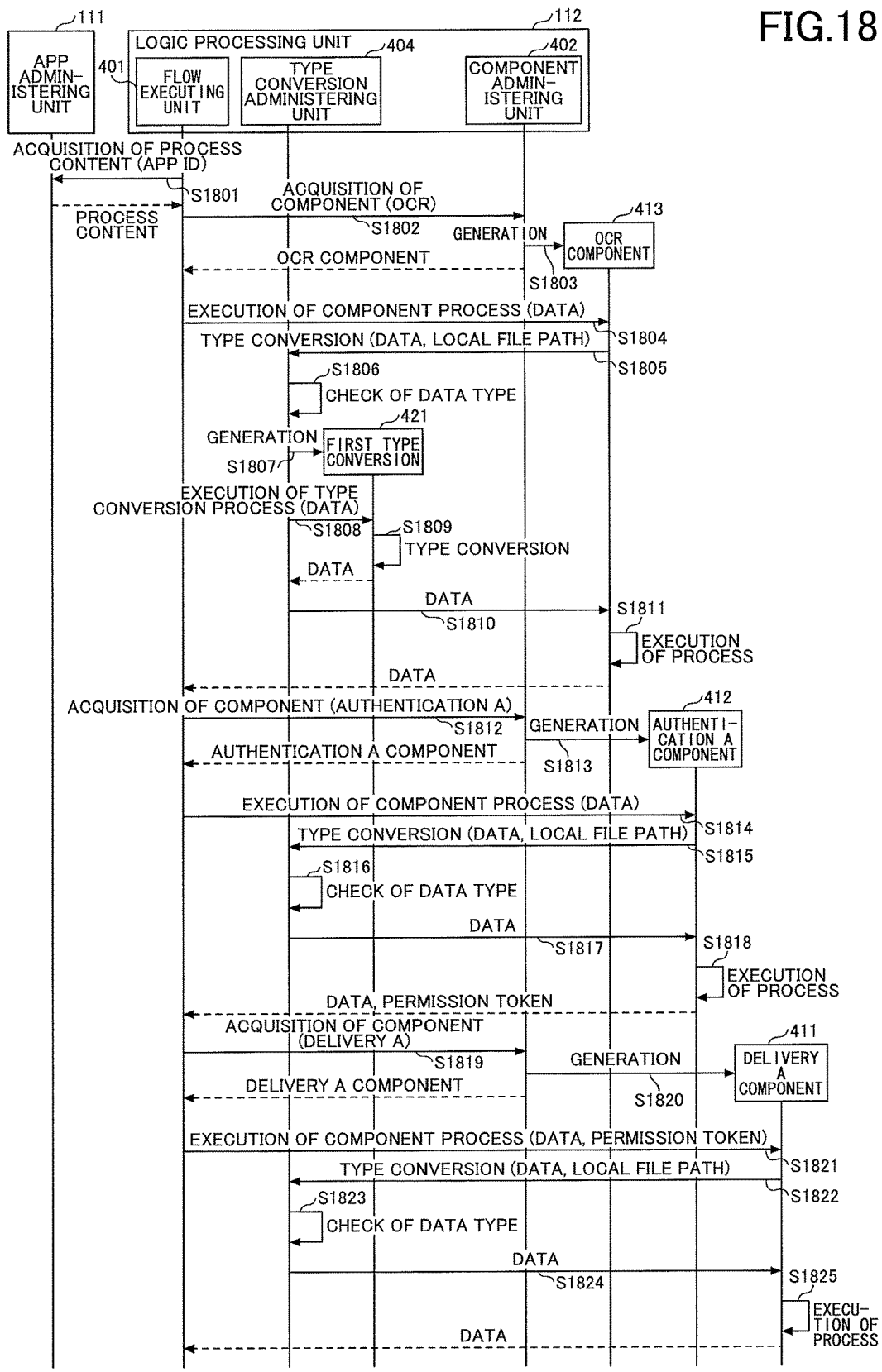
FIG. 18 is a sequence chart of an exemplary execution process of executing a process content in scan delivery service of the embodiment.

Referring to FIG. 18, detailed process of executing the process content in step S1610 is described. FIG. 18 is a sequence chart of an exemplary execution process of executing the process content in the scan delivery service of the embodiment.

After the flow executing unit 401 receives the execution request to execute a process from the browser 210, the flow executing unit 401 acquires the process content 1200A included in the app information 1000A of the app ID "app001" included in the execution request through the app administering unit 111. Said differently, the flow executing unit 401 acquires the process content 1200A through the app administering unit 111.

Next, the flow executing unit 401 requests the component administering unit 402 to acquire the component in accordance with the acquired process content 1200A (step S1802). Said differently, the flow executing unit 401 requests the component administering unit 402 to acquire an OCR component 413 based on the process 1202A described next to the process 1201A in a process content 1200A illustrated in FIG. 8.

When the component administering unit 402 receives the acquisition request to acquire the OCR component 413, the component administering unit 402 generates the OCR component 413 (step S1803). The OCR component 413 is generated by using the API for generating the component defined in the component common I/F 410.

Then, the component administering unit 402 returns the generated OCR component 413 to the flow executing unit 401. For example, the component administering unit 402 returns the address in the memory (e.g., the RAM 14), on which the OCR component 413 is deployed, to the flow executing unit 401.

The flow executing unit 401 requests the generated OCR component 413 to execute the process while designating the data (step S1804). The data type of the designated data is "InputStream". The designated data is an electronic file transferred from the browser 210.

Said differently, the flow executing unit 401 requests to execute the process by transferring the electronic file, which is transferred as the data type of "InputStream" from the browser 210, simply as "data" (without convincing the data type) to the OCR component 413. Referring to FIG. 18, this electronic file transferred without convincing the data type is simply indicated as the "data".

After the OCR component 413 receives the execution request of executing the process, the OCR component 413 requests the type conversion administering unit 404 to perform the type conversion (step S1805). Here, the type conversion request includes the data and a designation of "LocalFilePath" indicative of the data type, which is operable by the OCR component 413.

The type conversion administering unit 404 checks whether the data type of the data included in the above-received type conversion request matches the designated data type (step S1806).

Here, the data type of the data included in the received type conversion request is "InputStream" and the designated data type is "LocalFilePath". Accordingly, the type conversion administering unit 404 determines that the data type of the data included in the received type conversion request does not match the designated data type.

Then, the type conversion administering unit 404 refers to the type conversion table 3000, specifies the type conversion for converting "InputStream" to "LocalFilePath" (here, the first type conversion 421 is specified), and generates the specified type conversion (step S1807).

Next, the type conversion administering unit 404 requests the generated first type conversion 421 to perform the type conversion process while designating the data (step S1808).

Then, the first type conversion 421 receives the execution request to perform the type conversion process, and thereafter converts the data type of the data included in the execution request from "InputStream" to "LocalFilePath" (step S1809). Further, the first type conversion 421 returns the converted data to the type conversion administering unit 404. Thereafter, the type conversion administering unit 404 sends the data provided with the data conversion to the OCR component 413 (step S1810).

When the OCR component 413 receives the data provided with the type conversion, the OCR component 413 executes the process (step S1811). Said differently, the OCR process is executed for the electronic file indicated by the data (i.e., a path or an address) of the data type of "LocalFilePath".

More specifically, the OCR component 413 requests the OCR process 141 of the document servicing unit 141 to process, and the OCR process 141 executes the process to the electronic file. The OCR component 413 returns data indicative of the electronic file provided with the OCR process to the flow executing unit 401.

Here, the data returned by the OCR component 413 is the path or the address, each of which is indicative of the electronic file provided with the OCR process (said differently, the data type of the returned data is "LocalFilePath").

Next, the flow executing unit 401 requests the component administering unit 402 to acquire the component based on the acquired process content 1200A (step S1812). Said differently, the flow executing unit 401 requests the component administering unit 402 to acquire an authentication A component 412 based on the process 1203A described next to the process 1202A in the process content 1200A illustrated in FIG. 8.

After the component administering unit 402 receives the acquisition request to acquire the authentication A component 412, the component administering unit 402 generates the authentication A component 412 (step S1813). The authentication A component 412 is generated by using the API for generating the component defined in the component common I/F 410.

Then, the component administering unit 402 returns the generated authentication A component 412 to the flow executing unit 401. For example, the component administering unit 402 returns the address in the memory (e.g., the RAM 14), on which the authentication A component 412 is deployed, to the flow executing unit 401.

The flow executing unit 401 requests the generated authentication A component 412 to execute the process while designating the data (step S1814). Here, the designated data has the data type of "LocalFilePath" indicating the path or the address, each of which is indicative of the electronic file provided with the OCR process.

After the authentication A component 412 receives the execution request of executing the process, the authentication A component 412 requests the type conversion administering unit 404 to perform the type conversion (step S1815). Here, the type conversion request includes the data and a designation of "LocalFilePath" indicative of the data type, which is operable by the authentication A component 412.

The type conversion administering unit 404 receives the type conversion request and thereafter checks whether the data type of the data included in the above type conversion request matches the designated data type (step S1816).

Here, the data type of the data included in the received type conversion request is "LocalFilePath" and the designated data type is also "LocalFilePath". Accordingly, the type conversion administering unit 404 determines that the data type of the data included in the type conversion request matches the designated data type.

Then, the type conversion administering unit 404 sends the data included in the type conversion request to the authentication A component 412 (step S1817). As described, when the data types are determined to match in checking the data type (the process of step S1816), the type conversion administering unit 404 does not generate the type conversion.

After the authentication A component 412 receives the data from the type conversion administering unit 404, the authentication A component 412 executes the process (step S1818). Said differently, the authentication A component 412 acquires the corresponding permission token from the permission-token information table 1700 stored in the permission-token information memory unit 170 through the authenticating unit 130.

Specifically, in a case where the user ID of the user of the apparatus 20 is "user001", the authentication A component 412 sends this user ID, the app ID "app001", and the external service ID "service_a" to the authenticating unit 130. Then, the authenticating unit 130 acquires a permission token "aaaaa" corresponding to the user ID, the app ID, and the external service ID, which are received, from the permission-token information table 1700 and returns to the authentication A component 412.

In a case where the expiration date of the permission token expires, the authenticating unit 130 may use a previously acquired refresh token 130 to acquire the permission token again, for example. In this case, the authenticating unit 130 returns the permission token that is acquired again to the authentication A component 412.

The authentication A component 412 returns the data and the acquire permission token to the flow executing unit 401.

Next, the flow executing unit 401 requests the component administering unit 402 to acquire the component based on the acquired process content 1200A (step S1819). Said differently, the flow executing unit 401 requests the component administering unit 402 to acquire a delivery A component 411 based on the process 1204A described next to the process 1203A in a process content 1200A illustrated in FIG. 8.

When the component administering unit 402 receives the acquisition request to acquire the delivery A component 411, the component administering unit 132 generates the delivery A component 411 (step S1820). The delivery A component 411 is generated by using the API for generating the component defined in the component common I/F 410.

Then, the component administering unit 402 returns the generated delivery A component 411 to the flow executing unit 401. Said differently, the component administering unit 402 returns the address in the memory (e.g., the RAM 14), on which the delivery A component 411 is deployed, to the flow executing unit 401, for example.

The flow executing unit 401 requests the generated delivery A component 411 to execute the process while designating the data and the permission token (step S1821). Here, the designated data has the data type of "LocalFilePath" indicating the address or the path, each of which is indicative of the electronic file provided with the OCR process.

After the delivery A component 411 receives the execution request of executing the process, the delivery A component 411 requests the type conversion administering unit 404 to perform the type conversion (step S1822). Here, the type conversion request includes the data and a designation of "LocalFilePath" indicative of a data type, which is operable by the delivery A component 411.

The type conversion administering unit 404 receives the type conversion request and thereafter checks whether the data type of the data included in the above type conversion request matches the designated data type (step S1823).

Here, the data type of the data included in the received type conversion request is "LocalFilePath" and the designated data type is also "LocalFilePath". Accordingly, the type conversion administering unit 404 determines that the data type of the data included in the type conversion request matches the designated data type.

Then, the type conversion administering unit 404 sends the data included in the type conversion request to the delivery A component 411 (step S1824).

When the delivery A component 411 receives the data from the type conversion administering unit 404, the delivery A component 411 executes the process (step S1825). Said differently, the delivery A component 411 uses the permission token to deliver the data (the electronic file having the file name "test") to the folder having the folder name "FolderB" of the external storage system 301.

Specifically, the delivery A component 411 sends the permission token and the data to the file processing unit 1511 of the storage-service A collaborating unit 1501 using the API of "service-a/process/folder" illustrated in FIG. 5A. With this, the electronic file (the electronic file generated by scanning is provided with the OCR process) having the file name of "test" is stored in the folder name "FolderB" of the storage service A.

The delivery A component 411 returns the data indicative of the processed result to the flow executing unit 401.

As described above, the service providing system 10 of the embodiment can provide the scan delivery service to the apparatus 20. Thus, the service providing system 10 of the embodiment causes each component of the service providing system 10 to execute based on the process content to execute a sequence of processes indicated by the process content 1200.

In a case where the sequence of processes is executed in collaboration with the external service such as the external storage system 30, the service providing system 10 of the embodiment uses the permission token to use the resource of the external resource in the range of the scope of the permission token.

According to the embodiment, an appropriate scope can be set to an application processed in collaboration with the external service.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus."

What is claimed is:

1. An information processing system including at least one information processing apparatus and a plurality of programs respectively executing predetermined processes, the information processing system comprising:
   a hardware storage implementing a first memory configured to store, for each application executing a sequence of processes using electronic data in collaboration with an external service,
      flow information that defines program identification information that identifies at least one program from among the plurality of programs, the at least one program executing each process of the sequence of processes, and an execution order of the sequence of the processes of the at least one program,
      application ("app") identification information that identifies the application,
      scope information that specifies a predetermined scope associated with each process of the sequence of processes executed by the application, the scope information defining a range of operations that each process of the sequence of processes is permitted to execute on the external service, and screen information of a selection screen on which the electronic data, used in the sequence of processes, is designated by a user, while associating the flow information, the app identification information, and the scope information, with the screen information; and a hardware processor that executes program instructions, which causes the hardware processor to:
receive, from one apparatus from among at least one apparatus coupled to information processing system, a first request that includes the app identification information and external service identification information of the external service, which executes the sequence of processes in collaboration with the application identified by the app identification information, acquire a permission token from the external service identified by the external service identification information included in the first request, after the first request is received wherein a permission token scope of the permission token is determined as a sum of the respective predetermined scopes associated with each process of the sequence of processes defined by the flow information stored in the first memory in association with the application identification information, store the acquired permission token, user identification information identifying a user, and the app identification information in a second memory while associating the acquired permission token, the user identification information, and the app identification information, receive a second request including the app identification information from the one apparatus, send the screen information stored in the first memory in association with the app identification information included in the second request to the one apparatus being a request source of the second request, after the second request is received, receive a third request including information related to the electronic data designated by the user through the selection screen based on the sent screen information, cause the at least one program identified by the program identification information defined in the flow information stored in the first memory using the permission token stored in the second memory in accordance with the execution order defined in the flow information to execute the sequence of processes using the electronic data based on the information related to the electronic data included in the third request, after the request is received, convert a data type of the electronic data to a predetermined data type that is accessible by the at least one program, and execute the at least one program to execute the sequence of processes using the electronic data in response to determining that the scope information associated with each process of the sequence of processes is within the scope of the permission token.

2. The information processing system according to claim 1, wherein the at least one program includes a program executing a process related to an external service, and the program executing the process related to the external service includes at least a program executing a process of uploading the electronic data onto the external service.

3. The information processing system according to claim 2, wherein the at least one program, which executes the process related to the external service, executes the process related to the external service using a common API, which is commonly defined for the external service, and a unique API, which is uniquely defined for the external service.

4. An information processing apparatus including a plurality of programs respectively executing predetermined processes, the information processing apparatus comprising:

a hardware storage implementing a first memory configured to store, for each application executing a sequence of processes using electronic data in collaboration with an external service, flow information that defines program identification information that identifies at least one program from among the plurality of programs, the at least one program executing each process of the sequence of processes, and an execution order of the sequence of the processes of the at least one program, application ("app") identification information that identifies the application, scope information that specifies a predetermined scope associated with each process of the sequence of processes executed by the application, the scope information defining a range of operations that each process of the sequence of processes is permitted to execute on the external service, and screen information of a selection screen on which the electronic data, used in the sequence of processes, is designated by a user, while associating the flow information, the app identification information, and the scope information, with the screen information; and a hardware processor that executes program instructions, which causes the hardware processor to:
receive, from one apparatus from among at least one apparatus coupled to information processing apparatus, a first request that includes the app identification information and external service identification information of the external service, which executes the sequence of processes in collaboration with the application identified by the app identification information, acquire a permission token from the external service identified by the external service identification information included in the first request, after the first request is received wherein a permission token scope of the permission token is determined as a sum of the respective predetermined scopes associated with each process of the sequence of processes defined by the flow information stored in the first memory in association with the application identification information, store the acquired permission token, user identification information identifying a user, and the app identification information in a second memory while associating the acquired permission token, the user identification information, and the app identification information, receive a second request including the app identification information from the one apparatus, send the screen information stored in the first memory in association with the app identification information included in the second request to the one apparatus being a request source of the second request, after the second request is received, receive a third request including information related to the electronic data designated by the user through the selection screen based on the sent screen information, cause the at least one program identified by the program identification information defined in the flow information stored in the first memory using the permission token stored in the second memory in accordance with the execution order defined in the flow information to execute the sequence of processes using the electronic data based on the information related to the electronic data included in the third request, after the request is received, convert a data type of the electronic data to a predetermined data type that is accessible by the at least one program, and execute the at least one program to execute the sequence of processes using the electronic data in response to determining that the scope information associated with each process of the sequence of processes is within the scope of the permission token.

5. A method for processing information used in an information processing system including at least one information processing apparatus and a plurality of programs respectively executing predetermined processes, the information processing system including a first memory configured to store, for each application executing a sequence of processes using electronic data in collaboration with an external service, flow information that defines program identification information that identifies at least one program from among the plurality of programs, the at least one program executing each process of the sequence of processes, and an execution order of the sequence of the processes of the at least one program, application ("app") identification information that identifies the application, scope information that specifies a predetermined scope associated with each process of the sequence of processes executed by the application, the scope information defining a range of operations that each process of the sequence of processes is permitted to execute on the external service, and screen information of a selection screen on which the electronic data, used in the sequence of processes, is designated by a user, while associating the flow information, the app identification information, and the scope information, with the screen information; the method for processing information comprising:

receiving, from one apparatus from among at least one apparatus coupled to information processing system, a first request that includes the app identification information and external service identification information of the external service, which executes the sequence of processes in collaboration with the application identified by the app identification information;

acquiring a permission token from the external service identified by the external service identification information included in the first request, after the first request is received, wherein a permission token scope of the permission token is determined as a sum of the respective predetermined scopes associated with each process of the sequence of processes defined by the flow information stored in the first memory in association with the application identification information;

storing the acquired permission token, user identification information identifying a user, and the app identification information in a second memory while associating the acquired permission token, the user identification information, and the app identification information;

receiving a second request including the app identification information from the one apparatus;

sending the screen information stored in the first memory in association with the app identification information included in the second request to the one apparatus being a request source of the second request, after the second request is received;

receiving a third request including information related to the electronic data designated by the user through the selection screen based on the sent screen information;

causing the at least one program identified by the program identification information defined in the flow information stored in the first memory using the permission token stored in the second memory in accordance with the execution order defined in the flow information to execute the sequence of processes using the electronic data based on the information related to the electronic data included in the third request, after the request is received;

converting a data type of the electronic data to a predetermined data type that is accessible by the at least one program; and executing the at least one program to execute the sequence of processes using the electronic data in response to determining that the scope information associated with each process of the sequence of processes is within the scope of the permission token.

* * * * *